United States Patent
Coppens et al.

(10) Patent No.: US 11,421,378 B2
(45) Date of Patent: *Aug. 23, 2022

(54) FLUORINE-FREE FIBROUS TREATING COMPOSITIONS INCLUDING A POLYCARBODIIMIDE AND AN OPTIONAL PARAFFIN WAX, AND TREATING METHODS

(71) Applicant: 3M INNOVATIVE PROPERTIES COMPANY, St. Paul, MN (US)

(72) Inventors: Dirk M. Coppens, Beveren (BE); Rudolf J. Dams, Antwerp (BE); Chetan P. Jariwala, Woodbury, MN (US); Lin Chen, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/947,579

(22) Filed: Aug. 7, 2020

(65) Prior Publication Data
US 2020/0362508 A1 Nov. 19, 2020

Related U.S. Application Data

(62) Division of application No. 15/548,114, filed as application No. PCT/US2016/015945 on Feb. 1, 2016.

(60) Provisional application No. 62/116,118, filed on Feb. 13, 2015.

(51) Int. Cl.
| | |
|---|---|
| *D06M 15/263* | (2006.01) |
| *C14C 9/00* | (2006.01) |
| *D21H 21/16* | (2006.01) |
| *D21H 17/54* | (2006.01) |
| *D06M 15/59* | (2006.01) |
| *D21H 19/24* | (2006.01) |
| *D06M 15/653* | (2006.01) |
| *C08G 18/62* | (2006.01) |
| *C08G 18/09* | (2006.01) |
| *C08G 18/16* | (2006.01) |
| *D21H 17/57* | (2006.01) |
| *C08G 18/79* | (2006.01) |
| *C08G 18/02* | (2006.01) |
| *C09D 4/00* | (2006.01) |
| *D21H 17/33* | (2006.01) |
| *D06M 15/01* | (2006.01) |
| *D21H 17/37* | (2006.01) |
| *D21H 19/20* | (2006.01) |

(52) U.S. Cl.
CPC ........ *D06M 15/263* (2013.01); *C08G 18/025* (2013.01); *C08G 18/095* (2013.01); *C08G 18/168* (2013.01); *C08G 18/6229* (2013.01); *C08G 18/6283* (2013.01); *C08G 18/797* (2013.01); *C09D 4/00* (2013.01); *C14C 9/00* (2013.01); *D06M 15/01* (2013.01); *D06M 15/59* (2013.01); *D06M 15/653* (2013.01); *D21H 17/33* (2013.01); *D21H 17/37* (2013.01); *D21H 17/54* (2013.01); *D21H 17/57* (2013.01); *D21H 19/20* (2013.01); *D21H 19/24* (2013.01); *D21H 21/16* (2013.01); *D06M 2200/12* (2013.01)

(58) Field of Classification Search
CPC .... D06M 15/263; D06M 15/01; D06M 15/59; D06M 15/653; D06M 2200/12; C08F 220/36; C08G 18/025; C08G 18/095; C08G 18/6229; C08G 18/6283; C08G 18/797; C09D 4/00; C14C 9/00; D21H 17/33; D21H 17/37; D21H 17/54; D21H 17/57; D21H 19/20; D21H 19/24; D21H 21/16

See application file for complete search history.

(56) References Cited

U.S. PATENT DOCUMENTS

| | | |
|---|---|---|
| 2,941,988 A | 6/1960 | Wolf |
| 3,862,989 A | 1/1975 | Hansen |
| 3,896,251 A | 7/1975 | Landucci |
| 4,495,243 A | 1/1985 | Kishi |
| 4,692,503 A | 9/1987 | Das |
| 5,047,065 A | 9/1991 | Vogel |
| 5,061,756 A | 10/1991 | Hassel |
| 5,225,480 A | 7/1993 | Tseng |

(Continued)

FOREIGN PATENT DOCUMENTS

| | | |
|---|---|---|
| CN | 103628324 | 3/2014 |
| EP | 0448399 | 9/1991 |

(Continued)

OTHER PUBLICATIONS

AATCC Test Method 22—1996, Technical Manual of the American Associate of Textile Chemists and Colorists (AATCC), 2001, pp. 63-65.

(Continued)

*Primary Examiner* — Robert S Walters, Jr.
(74) *Attorney, Agent, or Firm* — Ann K. Gallagher

(57) ABSTRACT

A fluorine-free composition includes at least one polycarbodiimide compound derived from a carbodiimidization reaction of a carbodiimidization reaction mixture comprising at least one oligomer, wherein the oligomer comprises at least one isocyanate end group and at least two repeating units, wherein each of the at least two repeating units comprises at least one hydrocarbon group having at least 16 carbon atoms. The composition may also include at least one paraffin wax. Such compositions are useful for treating fibrous substrates to enhance their water-repellency.

10 Claims, No Drawings

(56) References Cited

U.S. PATENT DOCUMENTS

| | | |
|---|---|---|
| 5,276,175 A | 1/1994 | Dams |
| 5,350,631 A | 9/1994 | Tseng |
| 5,604,268 A | 2/1997 | Randen |
| 5,817,249 A | 10/1998 | Audenaert |
| 5,856,611 A | 1/1999 | Schlaefer |
| 7,354,458 B2 | 4/2008 | Sandner |
| 7,559,639 B2 | 7/2009 | Belelie |
| 7,750,093 B2 | 7/2010 | Elsbernd |
| 7,934,823 B2 | 5/2011 | Belelie |
| 7,950,948 B2 | 5/2011 | Amidon |
| 8,236,870 B2 | 8/2012 | Breton |
| 8,440,779 B2 | 5/2013 | Audenaert |
| 8,690,305 B2 | 4/2014 | Breton |
| 8,703,894 B2 | 4/2014 | Duschek |
| 8,742,022 B2 | 6/2014 | Pokorny |
| 8,853,293 B2 | 10/2014 | Breton |
| 11,124,918 B2 * | 9/2021 | Coppens ............. C08G 18/095 |
| 2006/0094851 A1 | 5/2006 | Audenaert |
| 2010/0115496 A1 | 5/2010 | Amichai |
| 2010/0173085 A1 | 7/2010 | Jariwala |
| 2014/0202647 A1 | 7/2014 | Hagiopol |

FOREIGN PATENT DOCUMENTS

| | | |
|---|---|---|
| EP | 0919576 | 6/1999 |
| EP | 0987362 | 3/2000 |
| JP | H04-272917 | 9/1992 |
| JP | 11-060667 | 3/1999 |
| JP | 2000-136351 | 5/2000 |
| JP | 2010-132844 | 6/2010 |
| WO | WO 1992-017635 | 10/1992 |
| WO | WO 2002-038850 | 5/2002 |
| WO | WO 2007-027420 | 3/2007 |
| WO | WO 2010-115496 | 10/2010 |
| WO | WO 2012-082516 | 6/2012 |
| WO | WO 2013-162704 | 10/2013 |
| WO | WO 2013-162705 | 10/2013 |
| WO | WO 2016-130415 | 8/2016 |
| WO | WO 2016-130503 | 8/2016 |

OTHER PUBLICATIONS

Kissa, Fluorinated Surfactantsand Repellents, 516-551 (2001).

Noll, Chemistry and Technology of Silicones, 585-595 (2012).

Organic Coatings and Applied Polymer Science Proceedings, vol. 48, Division of Organic Coatings and Plastics Chemistry at the American Chemical Society, 185$^{th}$ National Meeting, Seattle, Washington, Mar. 1983, pp. 998-1002.

Radhakrishnan, "Synthesis and Characterization of New Urethane-Acrylic Polymers," *Angewandte Makromoleculare Chemie*, vol. 187, 1991, pp. 1-10.

International Search Report for PCT International Application No. PCT/US2016/016713, dated May 31, 2016, 4 pages.

International Search Report for PCT International Application No. PCT/US2016/017076, dated Apr. 18, 2016, 5 pages.

International Search Report for PCT International Application No. PCT/US2016/015945, dated May 2, 2016, 4 pages.

\* cited by examiner

FLUORINE-FREE FIBROUS TREATING COMPOSITIONS INCLUDING A POLYCARBODIIMIDE AND AN OPTIONAL PARAFFIN WAX, AND TREATING METHODS

BACKGROUND

Compositions for treating fibrous substrates to enhance the water-repellency of the substrates are known and described in the literature, for example, in "Fluorinated Surfactants and Repellents," E. Kissa, Surfactant Science Series, vol. 97, Marcel Dekker, New York, Chapter 12, p. 516-551, or in "Chemistry and Technology of Silicones," by W. Noll, Academic Press, New York, Chapter 10, p. 585-595; however, there is a continual need for compositions that provide high water repellency, in particular high initial water repellency, and in certain situations, high water-repellent durability, especially compositions that are fluorine-free.

SUMMARY OF THE DISCLOSURE

The present disclosure provides fluorine-free fibrous treating compositions, and methods of use.

In one embodiment, the present disclosure provides a method of treating a fibrous substrate, wherein the method includes applying a fluorine-free treating composition in an amount sufficient to make the fibrous substrate water repellent (and in certain embodiments, durably water repellent). In such methods, the treating composition includes: at least one polycarbodiimide compound derived from a carbodiimidization reaction of a carbodiimidization reaction mixture comprising at least one oligomer, wherein the oligomer comprises at least one (typically, one) isocyanate end group and at least two repeating units, wherein each of the at least two repeating units comprises at least one (typically, one) hydrocarbon group having at least 16 carbon atoms.

A treating composition of the present disclosure may include one polycarbodiimide or a mixture of polycarbodiimides.

The present disclosure also provides a fibrous substrate treated by such method. In certain embodiments, the fibrous substrate is selected from the group of textile, leather, carpet, paper, and nonwoven fabrics.

In certain embodiments, the compositions described herein include a paraffin wax. A treating composition of the present disclosure may include one paraffin wax or a mixture of paraffin waxes.

For example, in one embodiment, the present disclosure provides a fluorine-free composition that includes at least one paraffin wax, and at least one polycarbodiimide compound; wherein the at least one polycarbodiimide compound has at least two hydrocarbon groups, each having at least 16 carbon atoms; or wherein the at least one polycarbodiimide compound is derived from a carbodiimidization reaction of a carbodiimidization reaction mixture comprising at least one oligomer, wherein the oligomer comprises at least one isocyanate end group and at least two repeating units, wherein each of the at least two repeating units comprises at least one hydrocarbon group having at least 16 carbon atoms.

Herein, a "fluorine-free" treating composition means that a treating composition includes less than 1 weight percent (1 wt-%) fluorine in a treating composition based on solids, whether in a concentrate or ready-to-use treating composition. In certain embodiments, a "fluorine-free" treating composition means that a treating composition includes less than 0.5 wt %, or less than 0.1 wt %, or less than 0.01 wt-%. The fluorine may be in the form of organic or inorganic fluorine-containing compounds.

The term "oligomer" includes compounds with at least 2 repeating units and up to 20 repeating units. According to a particular embodiment, the oligomer has 3 to 15 repeating units. According to another embodiment, the oligomer has 4 to 15 repeating units. In certain embodiments, an "oligomer" has a weight average molecular weight of up to 50,000 Daltons.

The term "residue" means that part of the original organic molecule remaining after reaction.

The term "hydrocarbon" refers to any substantially fluorine-free organic group that contains hydrogen and carbon. Such hydrocarbon groups may be cyclic (including aromatic), linear, or branched. Suitable hydrocarbon groups include alkyl groups, alkylene groups, arylene groups, and the like. Unless otherwise indicated, hydrocarbon groups typically contain from 1 to 60 carbon atoms. In some embodiments, hydrocarbon groups contain 1 to 30 carbon atoms, 1 to 20 carbon atoms, 1 to 10 carbon atoms, 1 to 6 carbon atoms, 1 to 4 carbon atoms, or 1 to 3 carbon atoms.

The term "alkyl" refers to a monovalent group that is a residue of an alkane and includes straight-chain, branched, cyclic, and bicyclic alkyl groups, and combinations thereof, including both unsubstituted and substituted alkyl groups. Unless otherwise indicated, the alkyl groups typically contain from 1 to 60 carbon atoms. In some embodiments, the alkyl groups contain 1 to 30 carbon atoms, 1 to 20 carbon atoms, 1 to 10 carbon atoms, 1 to 6 carbon atoms, 1 to 4 carbon atoms, or 1 to 3 carbon atoms. Examples of "alkyl" groups include, but are not limited to, methyl, ethyl, n-propyl, n-butyl, n-pentyl, isobutyl, t-butyl, isopropyl, n-octyl, n-heptyl, ethylhexyl, cyclopentyl, cyclohexyl, octadecyl, behenyl, adamantyl, norbornyl, and the like.

The term "alkylene" refers to a divalent group that is a residue of an alkane and includes groups that are linear, branched, cyclic, bicyclic, or a combination thereof. Unless otherwise indicated, the alkylene group typically has 1 to 60 carbon atoms. In some embodiments, the alkylene group has 1 to 30 carbon atoms, 1 to 20 carbon atoms, 1 to 10 carbon atoms, 2 to 10 carbon atoms, 1 to 6 carbon atoms, or 1 to 4 carbon atoms. Examples of "alkylene" groups include methylene, ethylene, 1,3-propylene, 1,2-propylene, 1,4-butylene, 1,4-cyclohexylene, 1,6 hexamethylene, and 1,10 decamethylene.

The term "arylene" refers to a divalent group that is aromatic and, optionally, carbocyclic. The arylene has at least one aromatic ring. Optionally, the aromatic ring can have one or more additional carbocyclic rings that are fused to the aromatic ring. Any additional rings can be unsaturated, partially saturated, or saturated. Unless otherwise specified, arylene groups often have 5 to 20 carbon atoms, 5 to 18 carbon atoms, 5 to 16 carbon atoms, 5 to 12 carbon atoms, 6 to 12 carbon atoms, or 6 to 10 carbon atoms.

The term (meth)acrylate refers to acrylates and methacrylates.

The term "comprises" and variations thereof do not have a limiting meaning where these terms appear in the description and claims. Such terms will be understood to imply the inclusion of a stated step or element or group of steps or elements but not the exclusion of any other step or element or group of steps or elements. By "consisting of" is meant including, and limited to, whatever follows the phrase "consisting of." Thus, the phrase "consisting of" indicates that the listed elements are required or mandatory, and that no other elements may be present. By "consisting essentially of" is meant including any elements listed after the phrase, and limited to other elements that do not interfere with or contribute to the activity or action specified in the disclosure for the listed elements. Thus, the phrase "consisting essentially of" indicates that the listed elements are required or mandatory, but that other elements are optional and may or may not be present depending upon whether or not they materially affect the activity or action of the listed elements.

The words "preferred" and "preferably" refer to claims of the disclosure that may afford certain benefits, under certain circumstances. However, other claims may also be preferred, under the same or other circumstances. Furthermore, the recitation of one or more preferred claims does not imply that other claims are not useful, and is not intended to exclude other claims from the scope of the disclosure.

In this application, terms such as "a," "an," and "the" are not intended to refer to only a singular entity, but include the general class of which a specific example may be used for illustration. The terms "a," "an," and "the" are used interchangeably with the phrases "at least one" and "one or more." The phrases "at least one of" and "comprises at least one of" followed by a list refers to any one of the items in the list and any combination of two or more items in the list.

The term "or" is generally employed in its usual sense including "and/or" unless the content clearly dictates otherwise.

The term "and/or" means one or all of the listed elements or a combination of any two or more of the listed elements.

Also herein, all numbers are assumed to be modified by the term "about" and in certain embodiments, preferably, by the term "exactly." As used herein in connection with a measured quantity, the term "about" refers to that variation in the measured quantity as would be expected by the skilled artisan making the measurement and exercising a level of care commensurate with the objective of the measurement and the precision of the measuring equipment used. Herein, "up to" a number (e.g., up to 50) includes the number (e.g., 50).

Also herein, the recitations of numerical ranges by endpoints include all numbers subsumed within that range as well as the endpoints (e.g., 1 to 5 includes 1, 1.5, 2, 2.75, 3, 3.80, 4, 5, etc.).

The term "room temperature" refers to a temperature of 20° C. to 25° C. or 22° C. to 25° C.

Herein, when a group is present more than once in a formula described herein, each group is "independently" selected, whether specifically stated or not. For example, when more than one Q group is present in a formula, each Q group is independently selected. Furthermore, subgroups contained within these groups are also independently selected.

The above summary of the present disclosure is not intended to describe each disclosed embodiment or every implementation of the present disclosure. The description that follows more particularly exemplifies illustrative embodiments. In several places throughout the application, guidance is provided through lists of examples, which examples may be used in various combinations. In each instance, the recited list serves only as a representative group and should not be interpreted as an exclusive list.

DETAILED DESCRIPTION OF ILLUSTRATIVE EMBODIMENTS

The present disclosure provides fluorine-free treating compositions for fibrous substrates, and methods of use. A treating composition of the present disclosure includes at least one polycarbodiimide compound (i.e., a compound that includes one or more groups of the formula (N=C=N)), and optionally at least one paraffin wax.

Treating compositions of the present disclosure are useful for treating a fibrous substrate to enhance the substrate's water repellency. As used herein, a substrate is water repellent if it demonstrates a minimum initial spray rating of at least 80, as determined by the Spray Rating Test described in the Examples Section. In certain embodiments, the initial spray rating is at least 90, or at least 100, as determined by the Spray Rating Test described in the Examples Section.

In certain embodiments, the fibrous substrates are treated such that they become durably water repellent. As used herein, a substrate is durably water repellent if it demonstrates a spray rating of at least 50 after 10 launderings, as determined by the Spray Rating Test with launderings (and optional launderings), described in the Examples Section. In certain embodiments, the spray rating is at least 80 after 10 launderings, or at least 80 after 20 launderings, as determined by the Spray Rating Test with launderings (and optional drying), described in the Examples Section.

Typically, an amount of treating composition is used to obtain a desired initial spray rating level and/or a desired spray rating level after laundering multiple times. In certain embodiments, the amount of treating composition is at least 0.1 weight percent (wt-%), or at least 0.2 wt-%, or at least 0.3 wt-% SOF (solids on fabric). In certain embodiments, the amount of treating composition is up to 2 wt-%, or up to 1.5 wt-%, or up to 1 wt-% SOF (solids on fabric).

Exemplary fibrous substrates include textile, leather, carpet, paper, and nonwoven fabrics.

Treating compositions of the present disclosure may be in the form of a concentrate, which may include up to 80 weight percent (wt-%) water, based on the total weight of the concentrated treating composition. Alternatively, treating compositions of the present disclosure may be in the form of a ready-to-use formulation, which may include more than 80 wt-% water, or at least 85 wt-% water, or at least 90 wt-% water, or at least 95 wt-% water, based on the total weight of the ready-to-use treating composition. In certain embodiments, a ready-to-use treating composition of the present disclosure include 98-99 wt-% water, based on the total weight of the ready-to-use treating composition.

Paraffin Wax

A treating composition of the present disclosure may include at least one paraffin wax. In certain embodiments, the paraffin wax has a melting point of 40° C. to 75° C. In certain embodiments, the paraffin wax has a melting point of 60° C. to 75° C.

When present in a treating composition of the present disclosure, the total amount of one or more paraffin waxes is an amount of 30 wt-% to 70 wt-%, and the total amount of one or more polycarbodiimide compounds is an amount of 30 wt-% to 70 wt-%. In certain embodiments, the total amount of one or more paraffin waxes is an amount of 50 wt-% to 70 wt-%, and the total amount of one or more polycarbodiimide compounds is an amount of 30 wt-% to 50 wt-%. These amounts are based on the total weight of solids in a treating composition (in a ready-to-use or a concentrated form).

Polycarbodiimides and Preparation Thereof

In certain embodiments, useful polycarbodiimide compounds include at least two hydrocarbon groups, each having at least 16 carbon atoms.

In certain embodiments, useful polycarbodiimide compounds are derived from a carbodiimidization reaction (i.e., a reaction that forms (N=C=N) groups) of a carbodiimidization reaction mixture that includes at least one oligomer, wherein such oligomer includes at least one (typically, one) isocyanate end group and at least two repeating units, wherein each of the at least two repeating units includes at least one (typically, one) hydrocarbon group having at least 16 carbon atoms (and in certain embodiments, up to 60 carbon atoms, or up to 30 carbon atoms). Polycarbodiimide compounds made this way may include compounds with end groups that are not both a hydrocarbon group of at least 16 carbon atoms.

Typically, a polycarbodiimide compound of the present disclosure, or mixtures thereof, may be prepared in a three-step reaction, although it will generally not be required to separate reaction products after the individual steps. That is, the reaction may be carried out in three steps in a single reactor. In a first step, a functionalized oligomer having at least two repeating units is prepared. In a second step, this functionalized oligomer is reacted with an isocyanate to form an isocyanate-containing oligomer (i.e., an oligomer having at least one isocyanate end group and at least two repeating units). Thus, the term "functionalized oligomer" means an oligomer that contains a functional group capable of reacting with an isocyanate. In a third step, the isocyanate-containing oligomer (i.e., oligomer with isocyanate end groups) is further reacted in a carbodimiidization reaction to form a polycarbodiimide. Thus, the reaction product of the second step, i.e., the oligomer that includes at least one isocyanate end group and at least two repeating units, may be formed in the reaction mixture without being isolated (i.e., it is formed in situ).

In certain embodiments, the polycarbodiimides of the present invention may be made by following exemplary reaction scheme:

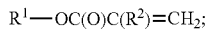

(Formula I)

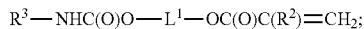

(Formula II)

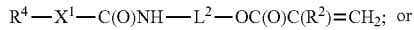

(Formula III)

(Formula IV)

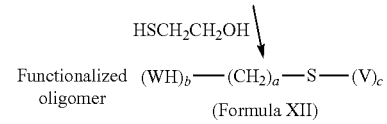

(Formula XII)

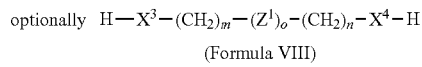

(Formula VIII)

OLIGOMERS with isocyanate end group

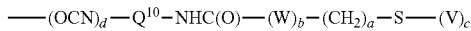

(Formula XIII)

↓ CARBODIIMIDIZATION

-continued

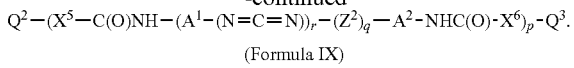

(Formula IX)

In this schematic, which is exemplary only and not intended to be representative of all embodiments herein, in Formula XII and XIII:

W is independently NH, N($R^6$), or O wherein $R^6$ is a hydrocarbon group having 1 to 20 carbon atoms;
$Q^{10}$ is an isocyanate residue;
S is sulfur; and
V is selected from:
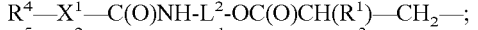
and
a combination thereof;
a is an integer from 1 to 10;
b is an integer from 1 to 5;
c is an integer from 2 to 20; and
d is an integer from 1 to 5.

Free-Radical Oligomerization of Unsaturated Monomers

In a first step, a functionalized (i.e., isocyanate-reactive) oligomer having at least two repeating units can be prepared by a free-radical oligomerization of one or more ethylenically unsaturated monomers, typically a non-fluorinated ethylenically unsaturated monomer, with a functionalized chain transfer agent. Typically, such monomers are (meth) acrylate monomers. That is, the isocyanate-containing oligomer used to make the polycarbodiimide in the carbodiimidization reaction may include at least two repeating units of at least one (meth)acrylate monomer.

In certain embodiments, the resultant oligomers and polycarbodiimides include at least 70 wt-%, or at least 80 wt-%, or at least 85 wt-%, or at least 90 wt-%, or all, of the repeating units with at least one hydrocarbon group having at least 16 carbon atoms (and in certain embodiments, up to 60 carbon atoms, or up to 30 carbon atoms), based on the total weight of the oligomers and polycarbodiimides.

In certain embodiments, the functionalized oligomers can be prepared by a free-radical oligomerization of (i) one or more ethylenically unsaturated monomers (e.g., (meth)acrylate monomers) having an isocyanate-derived group and a hydrocarbon chain having at least 16 carbon atoms, and (ii) one or more ethylenically unsaturated monomers having an isocyanate-derived group and a hydrocarbon chain having less than 16 carbon atoms, (iii) one or more ethylenically unsaturated monomers having no isocyanate-derived group but having a hydrocarbon chain of at least 16 carbon atoms and (iv) one or more ethylenically unsaturated monomers having no isocyanate-derived group and having a hydrocarbon chain of one to 15 carbon atoms, with a functionalized or non-functionalized mercaptan, with the proviso that the amount of monomers having at least 16 carbon atoms is at least 70%, or at least 80%, or at least 85%, or at least 90%, or 100% of the total amount of monomers.

In certain embodiments, at least 70%, or at least 80%, or at least 85%, or at least 90% by weight of the total monomers, or all, of the monomers used to make the oligomers and polycarbodiimides are (meth)acrylate monomers.

For example, in certain embodiments, the isocyanate-derived oligomer is made from at least 70% (by weight of total monomers) (meth)acrylate monomers having an isocyanate-derived group and a hydrocarbon group having at least 16 carbon atoms. In certain embodiments, all the (meth)acrylate monomers include an isocyanate-derived group and a hydrocarbon group having at least 16 carbon atoms.

Other monomers that could be copolymerized with the (meth)acrylate monomers include other ethylenically unsaturated monomers such as olefinic hydrocarbons (including isoprene, butadiene, or chloroprene), vinyl-, allyl-, or vinylidene-halides (including vinylidene chloride or vinyl chloride), styrene and its derivatives, vinylesters (including vinylacetate), allylesters (including allylacetate), alkylvinyl, or alkylallylethers (including octadecylvinylether), nitriles (including acrylonitrile), maleate or itaconate esters (including di-octadecylitaconate), and (meth)acrylamides (including octadecylacrylamide). Monomers with a hydrocarbon group having less than 16 carbon atoms include methyl (meth)acrylate, butyl (meth)acrylate, ethylhexyl (meth)acrylate, dodecyl (meth)acrylate, as well as many others known to those skilled in the art.

In certain embodiments, preferred (meth)acrylate monomers (for making a functionalized oligomer, which is then used to make an isocyanate-containing oligomer) have the following formula:

$$R^1-OC(O)C(R^2)=CH_2 \quad \text{(Formula I)}$$

wherein: $R^1$ comprises a hydrocarbon group having at least 16 carbon atoms (and in certain embodiments up to 60 carbon atoms, or up to 30 carbon atoms); and $R^2$ is H or $CH_3$. Examples of $R^1$ groups that include a hydrocarbon group can be more specifically described by reference to compounds of the following Formulas II, III, and IV. Also, $R^1$ can be a hydrocarbon group, such as an octadecyl (C18) group, behenyl (C22) group, or 2-tetradecyloctadecyl (C32) group.

In certain embodiments, the (meth)acrylate monomer of Formula I is selected from one or more (meth)acrylate monomers of the following formulas:

$$R^3-NHC(O)O-L^1-OC(O)C(R^2)=CH_2 \quad \text{(Formula II);}$$

$$R^4-X^1-C(O)NH-L^2-OC(O)C(R^2)=CH_2 \quad \text{(Formula III); or}$$

$$R^5-X^2-C(O)NH-Q^1-NHC(O)O-L^3-OC(O)C(R^2)=CH_2 \quad \text{(Formula IV).}$$

In Formulas II, III, and IV, each $R^2$ is independently H or $CH_3$.

In Formulas II, III, and IV, $R^3$, $R^4$, and $R^5$ are independently a hydrocarbon group having at least 16 carbon atoms (in certain embodiments, up to 60 carbon atoms, or up to 30 carbon atoms). Examples of such hydrocarbon groups include a hexadecyl (C16) group, an octadecyl (C18) group, an arachidyl (C20) group, a behenyl (C22) group, a lignoceryl (C24) group, a ceryl (C26) group, a montanyl (C28) group, a myricyl (C30) group, a 2-dodecylhexadecyl (C28 branched) group, a 2-tetradecyloctadecyl (C32 branched) group, and long chain linear alkyl groups of 30 to 60 carbon atoms (available under the UNILIN brand). In certain embodiments, $R^4$ and $R^5$ may be branched.

In Formulas II, III, and IV, $L^1$, $L^2$, and $L^3$ are independently a branched or straight chain alkylene group having 2 to 10 carbon atoms, an arylene group (in certain embodiments, an arylene group having 5 to 12 carbon atoms), or a combination thereof. Examples of such alkylene groups include $-CH_2CH_2-$, $-CH_2CH_2CH_2-$, $-CH_2CH_2CH_2CH_2-$, and the like. Examples of such arylene groups include phenyl, naphthyl, and the like. Examples of combinations of alkylene and arylene groups include benzyl, ethylphenyl, and the like. In certain embodiments, $L^1$, $L^2$, and $L^3$ are independently a branched or straight chain alkylene group having 2 to 10 carbon atoms.

In Formulas II, III, and IV, $X^1$ and $X^2$ are independently S, $-NH$, $-N(R^6)$, or O, wherein $R^6$ is a hydrocarbon group (in certain embodiments, an alkyl group) having 1 to 20 carbon atoms. Examples of $R^6$ hydrocarbon groups include alkyl groups such as methyl, ethyl, decyl, octadecyl, and the like.

In Formula IV, $Q^1$ is a divalent isocyanate residue (i.e., an aromatic or aliphatic diisocyanate without the 2 isocyanate functional groups). Examples of divalent isocyanate residues include 2,4-toluenyl and 4,4'-methylenebis(phenyl).

It is noted that (meth)acrylate monomers of Formulas II, III, and IV are more specific embodiments of the (meth)acrylate monomers of Formula I. That is, (meth)acrylate monomers of Formula II are within the scope of Formula I, wherein $R^1$ of Formula I is $R^3-NHC(O)O-L^1-$. (Meth)acrylate monomers of Formula III are within the scope of Formula I, wherein $R^1$ of Formula I is $R^4-X^1-C(O)NH-L^2-$. (Meth)acrylate monomers of Formula IV are within the scope of Formula I, wherein $R^1$ is $R^5-X^2-C(O)NH-Q^1-NHC(O)O-L^3-$.

Examples of suitable (meth)acrylate monomers of Formula I include those of Formulas II, III, and IV, as well as octadecyl acrylate, octadecylmethacrylate, behenylacrylate, behenylmethacrylate, 2-tetradecyloctadecylacrylate, 2-tetradecyloctadecylmethacrylate, and the like.

Examples of suitable (meth)acrylate monomers of Formula II include the reaction product of stearylisocyanate with 2-hydroxyethyl(meth)acrylate (for example, $C_{18}H_{37}-NHC(O)O-CH_2CH_2-OC(O)CH=CH_2$), the reaction product of stearyl isocyanate with 3-hydroxypropyl (meth)acrylate, and the reaction product of stearylisocynate with 4-hydroxybutyl (meth)acrylate.

Examples of suitable (meth)acrylate monomers of Formula III include the reaction product of isocyanatoethyl (meth)acrylate with stearyl alcohol, the reaction product of isocyanatoethyl(meth)acrylate with behenylalcohol, and the reaction product of isocyanatoethyl(meth)acrylate with 2-tetradecyloctadecanol.

Examples of suitable (meth)acrylate monomers of Formula IV include the reaction product of 2,4'-toluene diisocyanate (TDI) with stearyl alcohol and 2-hydroxyethyl (meth)acrylate, the reaction product of TDI with stearyl alcohol and 3-hydroxypropyl (meth)acrylate, the reaction product of TDI with stearyl alcohol and 4-hydroxybutyl (meth)acrylate, the reaction product of TDI with behenylalcohol and 2-hydroxyethyl (meth)acrylate, and the like.

Techniques and conditions for making the (meth)acrylate monomers described herein would be well known to one of skill in the art. For example, a suitable (meth)acrylate monomer reactant (e.g., hydroxyethyl acrylate) and an isocyanate reactant (e.g., stearyl isocyanate) can be combined with or without an appropriate catalyst.

A catalyst in an appropriate amount (e.g., 500 ppm) may be used, but is not mandatory (particularly if higher temperatures are used). Exemplary catalysts include dibutyl tindilaurate (DBTDL) and bismuth neodecanoate (e.g., Shepherd Bicat 8108M, ABCR Bismuth (III) neodecanoate, superconductor grade, about 60% in neodecanoic acid (15-20% Bi), or Strem Chemicals Bismuth (III) neodecanoate, superconductor grade, about 60% in neodecanoic acid (15-20% Bi)).

The reaction to form a (meth)acrylate with an isocyanate-derived group can typically be carried out in a temperature range of 40° C. to 100° C., or 70° C. to 100° C., or 75° C. to 95° C. preferably under dry conditions (e.g., dry air). If no catalyst is used, a reaction temperature of 70° C. to 100° C. is preferred. Typically, the reaction is carried out in 1-24 hours, or 4-15 hours.

To prevent unwanted radical polymerization during the synthesis, a stabilizer in an appropriate amount (e.g., 50 to 500 parts per million (ppm)), such as 3,5-di-tert-butyl-4-hydroxy-toluene (BHT), 4-methoxyphenol (MOP), or hydroquinone (HQ) may be used, but is not mandatory.

Such (meth)acrylate monomers may be used in a first step to make functionalized oligomers (i.e., oligomers that contain a functional group capable of reacting with an isocyanate) by a free-radical oligomerization.

The free-radical oligomerization is typically carried out in the presence of mono- or di-functional hydroxyl- or amino-functionalized chain transfer agents, in order to prepare mono- or di-functionalized oligomers, respectively. Examples of monofunctional chain transfer agents include 2-mercaptoethanol, 3-mercapto-2-butanol, 3-mercapto-2-propanol, 3-mercapto-1-propanol, and 2-mercapto-ethylamine. A particularly suitable monofunctional chain transfer agents is 2-mercaptoethanol. Examples of difunctional chain transfer agents include those having two hydroxyl or amino groups or one hydroxyl and one amino group. A suitable example of a difunctional chain transfer agent is 3-mercapto-1,2-propanediol (thioglycerol).

In certain embodiments, the chain transfer agent is a mercaptan, which is functionalized with at least one isocyanate-reactive group. In certain embodiments, the chain transfer agent is a mercaptan, which is functionalized with at least one alcohol or amine group. In certain embodiments, the chain transfer agent is a mercaptan that is not functionalized.

In certain embodiments non-functional mercaptans are used, i.e., mercaptans that do not contain an additional isocyanate-reactive group (e.g., a hydroxy group). In order to make a functionalized oligomer with such mercaptans, the non-functional mercaptan is reacted with a mixture of (meth)acrylates wherein at least one (meth)acrylate has a functional group capable of reacting with an isocyanate group. Examples of non-functionalized mercaptans include octylmercaptan, dodecylmercaptan, octadecylmercaptopropionate, and octadecylmercaptan. Examples of functionalized (meth)acrylate capable of undergoing a reaction with an isocyanate group are 2-hydroxyethyl (meth)acrylate, 3-hydroxypropyl (meth)acrylate, and 4-hydroxybutyl (meth)acrylate.

In order to prepare the functionalized oligomers, a free-radical initiator may be used to initiate the oligomerization. Free-radical initiators include those known in the art and include, in particular, azo compounds such as 2,2'-azobis(2-methylbutyronitrile), 2,2'-azobisisobutyronitrile (AIBN) and 2,2'-azobis(2-cyanopentane), and the like, hydroperoxides such as cumene, t-butyl- and t-amyl-hydroperoxide, and the like, peroxyesters such as t-butylperbenzoate, di-t-butylperoxyphtalate, and the like, and diacylperoxides such as benzoyl peroxide, lauroyl peroxide, and the like.

The oligomerization reaction to form a functionalized oligomer may be carried out in a wide variety of solvents suitable for organic free-radical reactions. Particularly suitable solvents are solvents that do not interfere with the isocyanate reactions in the subsequent steps to form the polycarbodiimide. The reactants can be present in the solvent at any suitable concentration, e.g., from about 5 percent to about 90 percent by weight, based on the total weight of the reaction mixture. Examples of suitable solvents include aliphatic and alicyclic hydrocarbons (e.g., hexane, heptane, cyclohexane), ethers (e.g., diethylether, glyme, diglyme, diisopropyl ether), esters (e.g., ethylacetate, butylacetate), ketones (e.g., acetone, methylethyl ketone, methyl isobutyl ketone), and mixtures thereof.

The oligomerization reaction to form a functionalized oligomer can be carried out at a temperature suitable for conducting a free-radical oligomerization reaction. Particular temperatures and solvents for use can be easily selected by those skilled in the art based on considerations such as the solubility of reagents, the temperature required for the use of a particular initiator, molecular weight desired, and the like. While it is not practical to enumerate a particular temperature suitable for all initiators and all solvents, generally suitable temperatures are 30° C. and 150° C. In certain embodiments, the temperature is 55° C. and 90° C., or 75° C. and 80° C. Reaction times typically are within 1 to 24 hours, and often within 4 to 15 hours.

In certain embodiments, the oligomer is made by the oligomerization of a mercaptan with a (meth)acrylate monomer comprising an isocyanate-derived group (e.g., a urethane group or a urea group) and a hydrocarbon group having at least 16 carbon atoms (and in some embodiments, up to 60 carbon atoms), wherein the molar ratio of the mercaptan with the (meth)acrylate is 1:4 to 1:20, or a molar ratio of the mercaptan with the (meth)acrylate is 1:8 to 1:16.

In certain embodiments, the oligomer has at least one of the following formulas:

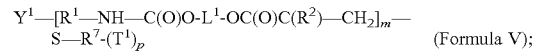

$Y^1$—[$R^1$—NH—C(O)O-$L^1$-OC(O)C($R^2$)—$CH_2$]$_m$—
    S—$R^7$-($T^1$)$_p$    (Formula V);

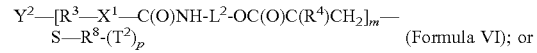

$Y^2$—[$R^3$—$X^1$—C(O)NH-$L^2$-OC(O)C($R^4$)$CH_2$]$_m$—
    S—$R^8$-($T^2$)$_p$    (Formula VI); or

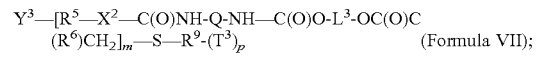

$Y^3$—[$R^5$—$X^2$—C(O)NH-Q-NH—C(O)O-$L^3$-OC(O)C
    ($R^6$)$CH_2$]$_m$—S—$R^9$-($T^3$)$_p$    (Formula VII);

In Formulas V, VI, and VII, $Y^1$, $Y^2$, and $Y^3$, respectively, are independently H or an initiator residue. The initiator residue may be the residue of a free-radical initiator, such as azo compounds, such as 2,2'-azobis(2-methylbutyronitrile), 2,2'-azobisisobutyronitrile (AIBN) and 2,2'-azobis(2-cyanopentane) and the like, hydroperoxides such as cumene, t-butyl- and t-amyl-hydroperoxide, peroxyesters such as t-butylperbenzoate and di-t-butylperoxyphtalate, diacylperoxides such as benzoyl peroxide and lauroyl peroxide. For example, if the free radical initiator used in making the oligomers is 2,2'-azobis(2-methylbutyronitrile) (V-59 initiator), which has the following structure $H_3CH_2C$—C($CH_3$) (CN)—N=N—C($CH_3$)(CN)—$CH_2CH_3$, the residue is believed to be —C($CH_3$)(CN)—$CH_2CH_3$, although there may be other fragments of the initiator forming the residue.

In Formulas V, VI, and VII, $R^1$, $R^3$, and $R^5$, respectively, are independently a hydrocarbon group having at least 16 carbon atoms (and in some embodiments, up to 60 carbon atoms, and in some embodiments up to 30 carbon atoms), as described above in Formulas I, II, III, and IV.

In Formulas V, VI, and VII, $R^2$, $R^4$, and $R^6$, respectively, are independently H or $CH_3$.

In Formulas V, VI, and VII, $L^1$, $L^2$, and $L^3$, respectively, are independently a branched or straight chain alkylene group having 2 to 10 carbon atoms, an arylene group (in certain embodiments, an arylene group having 5 to 12 carbon atoms), or a combination thereof, as described above in Formulas I, II, III, and IV.

In Formulas VI and VII, $X^1$ and $X^2$ are independently O, S, —NH, or —N($R^{10}$), wherein $R^{10}$ is a hydrocarbon group (in certain embodiments, an alkyl group) having 1 to 20 carbon atoms, as described above in Formulas III and IV.

In Formula VII, Q is a divalent isocyanate residue, as described above in Formula IV.

In Formulas V, VI, and VII, each m is independently an integer of 2 to 20. In certain embodiments, m is an integer of 4 to 20.

In Formulas V, VI, and VII, $R^7$, $R^8$, and $R^9$ are independently a divalent or trivalent linking group having 1 to 10 carbon atoms.

In Formulas V, VI, and VII, $T^1$, $T^2$, and $T^3$ are is independently —OH, —NH$_2$ or —NH($R^{11}$), wherein $R^{11}$ is H a hydrocarbon group (in certain embodiments, an alkyl group) having 1 to 10 carbon atoms.

In Formulas V, VI, and VII, each p is independently 1 or 2.

In Formulas V, VI, and VII, S is sulfur.

In certain embodiments, the oligomer has at least one of the following formulas:

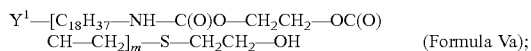

$Y^1$—[C$_{18}$H$_{37}$—NH—C(O)O—CH$_2$CH$_2$—OC(O)CH—CH$_2$]$_m$—S—CH$_2$CH$_2$—OH     (Formula Va);

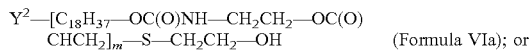

$Y^2$—[C$_{18}$H$_{37}$—OC(O)NH—CH$_2$CH$_2$—OC(O)CHCH$_2$]$_m$—S—CH$_2$CH$_2$—OH     (Formula VIa); or

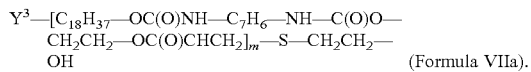

$Y^3$—[C$_{18}$H$_{37}$—OC(O)NH—C$_7$H$_6$—NH—C(O)O—CH$_2$CH$_2$—OC(O)CHCH$_2$]$_m$—S—CH$_2$CH$_2$—OH     (Formula VIIa).

In Formulas Va, VIa, and VIIa, $Y^1$, $Y^2$, and $Y^3$ are independently an initiator residue as described above.

In Formulas Va, VIa, and VIIa, each m is independently an integer from 4 to 20; and In Formulas Va, VIa, and VIIa, S is sulfur.

Compounds of Formula Va are within the scope of compounds of Formula V. Compounds of Formula VIa are within the scope of compounds of Formula VI. Compounds of Formula VIIa are within the scope of compounds of Formula VII.

Condensation Reaction of Functionalized Oligomer to Form Isocyanate-Containing Oligomer In a second step, an isocyanate-containing oligomer (i.e., an isocyanate oligomer having at least one isocyanate end group) is prepared by a condensation reaction of the functionalized (i.e., isocyanate-reactive) oligomer with an excess of a polyisocyanate. Polyisocyanates can be di-, tri-, or higher functional isocyanates. Polyisocyanates may also include polymeric compounds with 4 or more isocyanates or nonpolymeric compounds with 4 or more isocyanates. The reaction product of such condensation reaction is typically a mixture of isocyanate-containing oligomers.

Examples of diisocyanates include 4,4'-methylenediphenylenediisocyanate (MDI), 2,4-toluenediisocyanate, 2,6-toluene diisocyanate, o, m, and p-xylylene diisocyanate, 4,4'-diisocyanatodiphenylether, 3,3'-dichloro-4,4'-diisocyanatodiphenylmethane, 4,4'-diphenyldiisocyanate, 4,4'-diisocyanatodibenzyl, 3,3'-dimethoxy-4,4'-diisocyanatodiphenyl, 3,3'-dimethyl-4,4'-diisocyanatodiphenyl, 2,2'-dichloro-5,5'-dimethoxy-4,4'-diisocyanato diphenyl, 1,3-diisocyanatobenzene, 1,2-naphthylene diisocyanate, 4-chloro-1,2-naphthylene diisocyanate, 1,3-naphthylene diisocyanate, and 1,8-dinitro-2,7-naphthylene diisocyanate; alicyclic diisocyanates such as 3-isocyanatomethyl-3,5,5-trimethylcyclohexylisocyanate; 3-isocyanatomethyl-3,5,5-trimethylcyclohexylisocyanate; aliphatic diisocyanates such as 1,6-hexamethylenediisocyanate, 2,2,4-trimethyl-1,6-hexamethylenediisocyanate, and 1,2-ethylenediisocyanate; cyclic diisocyanates such as isophorone diisocyanate (IPDI) and dicyclohexylmethane-4,4'-diisocyanate. Examples of triisocyanates include aliphatic triisocyanates such as 1,3,6-hexamethylenetriisocyanate and aromatic triisocyanates such as tri-(4-isocyanatophenyl)-methane. Examples of polymeric isocyanates include polymethylenepolyphenylisocyanate (PAPI).

Particularly suitable isocyanates are aromatic isocyanates, including MDI and PAPI. Particularly suitable diisocyanates are aromatic isocyanates, including MDI.

In certain embodiments, in addition to the functionalized (isocyanate-reactive) oligomer, at least one additional isocyanate-reactive compound may be used in making the isocyanate-containing oligomers. In certain embodiments, up to 50 weight percent (wt-%), or up to 30 wt-%, or up to 20 wt-%, based on the weight of the reactant solids, of such isocyanate-reactive compounds may be used in making the isocyanate-containing oligomers and resultant polycarbodiimides.

Such additional isocyanate-reactive compounds may include: a hydrocarbon group having 2 to 60 carbon atoms; a polydimethylsiloxane segment having a weight average molecular weight of at least 200; a divalent polyoxyalkylene group comprising 2 to 100 alkylene oxide repeating units, wherein the alkyleneoxide unit has 2 to 10 carbon atoms; or a combination thereof.

Such additional isocyanate-reactive compounds are typically compounds containing one or two isocyanate-reactive groups and include mono- and di-, tri-, and poly-functional alcohols, thiols, and amines. The additional isocyanate-reactive compounds are non-fluorinated. A single compound or a mixture of different compounds may be used.

Examples include alkanols, such as methanol, ethanol, n-propylalcohol, isopropyl alcohol, n-butyl alcohol, isobutyl alcohol, t-butyl alcohol, n-amyl alcohol, t-amyl alcohol, 2-ethylhexanol, glycidol, (iso)stearyl alcohol, behenyl alcohol, branched long chain alkanols, such as Guerbet alcohols (2-alkyl alkanols having C-14 to C-32 alkyl chains, available from Sasol, Germany), alcohols comprising poly(oyalkylene) groups, such as methyl or ethyl ether of polyethyleneglycol, hydroxyl-terminated methyl or ethyl ether of random or block copolymer of ethyleneoxide and/or propyleneoxide and polysiloxane (e.g., polydimethylsiloxane) group-containing alcohols. Further examples include diols, such as 1,4-butanediol, 1,6-hexanediol, 1-10-decanediol, 4,4'-isopropylidene diphenol (Bisphenol A), glycerol, pentaerythritol, dipentaerythritol; polyester diols, such as polycaprolactone diol, fatty acid dimer diols and poly(oxy) alkylenediols with an oxyalkylene group having 2 to 4 carbon atoms, such as —OCH$_2$CH$_2$—, —O(CH$_2$)$_4$—, —OCH$_2$CH$_2$CH$_2$—, —OCH(CH$_3$)CH$_2$—, and —OCH(CH$_3$)CH(CH$_3$)— (the oxyalkylene units in said poly(oxyalkylene) may be the same, as in polypropyleneglycol, or present as a mixture), and ester diols, such as glycerol monostearate and polysiloxane-containing (e.g., polydimethylsiloxane-containing) diols.

Further suitable isocyanate-reactive compounds include amino-containing compounds, such as octadecylamine, di(octadecyl)amine, 1,6-hexamethylenediamine, amino-terminated polyethyleneoxide or propyleneoxide or copolymers thereof, amino-terminated methyl or ethylethers of polyethyleneoxide or polypropyleneoxide or copolymers thereof and amino group-terminated polysiloxanes, for example, polydimethylsiloxanes.

Still further suitable isocyanate-reactive compounds include thiol-containing compounds, such as octadecylmercaptan, dodecylmercaptan, octadecylmercaptopropionate, 1,4-butanedithiol, and 1,6-hexanedithiol.

In certain embodiments, the additional isocyanate-reactive difunctional compound has the following formula:

  (Formula VIII)

In Formula VIII, $X^3$ and $X^4$ are independently S, —NH, —N($R^{10}$) or O, wherein $R^{10}$ is a hydrocarbon group (in certain embodiments, an alkyl group) having 1 to 20 carbon atoms. Examples of $R^{10}$ hydrocarbon groups include alkyl groups such as methyl, ethyl, decyl, octadecyl, and the like.

In Formula VIII, r and s are independently integers from 1 to 12 (and in certain embodiments, 1 to 10).

In Formula VIII, o is 0 or 1.

In Formula VIII, $Z^1$ is selected from: a branched or straight chain alkylene group having 1 to 20 carbon atoms; a divalent polydimethylsiloxane group comprising 2 to 100 dimethylsiloxane repeating units; a divalent alkylene oxide group comprising 2 to 100 alkylene oxide repeating units; and a combination thereof. Examples of branched or straight chain alkylene groups include —$C_2H_4$—, —$C_3H_6$—, —$C_4H_8$—, and the like. Examples of divalent polydimethylsiloxane groups include —$CH_2CH_2CH_2(Si(CH_3)_2O)_q$—$CH_2CH_2CH_2$—, wherein q is an integer from 2 to 100. Examples of divalent alkylene oxide groups include —$(CH_2CH_2O)_q$—, wherein q is an integer from 2 to 100.

Examples of compounds of Formula VIII include ethyleneglycol, 1,10-decanediol, 1,6-hexamethylenediamine, polyethyleneglycols with MW of 200 to 1000, and the like.

The isocyanate-reactive compounds may be used alone or in combination.

Alternatively, isocyanate-reactive compounds, such as the difunctional compounds of Formula VIII may be consumed in a carbodimidization reaction mixture (step 3, discussed below).

This second step of forming the isocyanate-containing oligomer by a condensation reaction may be carried out under conventional conditions well-known to those skilled in the art. In certain embodiments, the condensation reaction is carried out under dry conditions in a polar solvent such as ethylacetate, acetone, methyl isobutyl ketone, and the like. Suitable reaction temperatures will be easily determined by those skilled in the art based on the particular reagents, solvents, and catalysts being used. While it is not practical to enumerate particular temperatures suitable for all situations, generally suitable temperatures are room temperature to 120° C.

In certain embodiments the condensation reaction is carried out without catalyst present. In certain embodiments the condensation reaction is carried out with catalyst present; these catalyst are well known to those skilled in the art and include, for example, tin-catalysts, such as dibutyltindilaurate or tinoctoate.

In certain embodiments, the weight average molecular weight of the functionalized oligomers (and the resultant isocyanate-containing oligomers) may be at least 600, or at least 1500, or at least 2000 Daltons.

In certain embodiments, the weight average molecular weight of the functionalized oligomers (and the resultant isocyanate-containing oligomers) may be up to 50,000, or up to 30,000, or up to 10,000 Daltons.

Carbodiimidization Reaction of Isocyanate-Containing Oligomers

Polycarbodiimide compounds of the present disclosure may be formed by a condensation reaction of the oligomers having at least one isocyanate end group and at least two repeating units, in the presence of a suitable catalyst.

Representative examples of suitable catalysts are described, for example, in U.S. Pat. Nos. 2,941,988, 3,862, 989, and 3,896,251. Examples include 3-methyl-1-phenyl-2-phospholene-1-oxide (MPPO), 1-ethyl-3-phospholine, 1-ethyl-3-methyl-3-phospholine-1-oxide, 1-ethyl-3-methyl-3-phospholine-1-sulfide, 1-ethyl-3-methyl-phospholidine, 1-ethyl-3-methyl-phospholidine-1-oxide, 3-methyl-1-phenyl-3-phospholine-1-oxide and bicyclic terpene alkyl or hydrocarbyl aryl phosphine oxide or camphene phenyl phosphine oxide.

The particular amount of catalyst used will depend to a large extent on the reactivity of the catalyst itself and the isocyanate. A concentration range of 0.05-5 parts of catalyst per 100 parts of oligomer having at least one isocyanate group is generally suitable.

In certain embodiments, in addition to the isocyanate-containing oligomers (those which include at least one isocyanate end group and at least two repeating units, wherein each of the repeating units includes at least one hydrocarbon group having at least 16 carbon atoms), the carbodiimidization reaction mixture may further include additional isocyanate compounds other than the isocyanate-containing oligomer. Such additional isocyanate compounds include mono-isocyanates as well as di-, tri-, or poly-isocyanates, such as those described above, including for example, MDI and PAPI.

In certain embodiments, up to 90 weight percent (wt-%), or up to 70 wt-%, or up to 50 wt-%, or up to 30 wt-%, or up to 20 wt-%, based on the weight of the reactant solids, of such additional isocyanate compounds may be used in making the polycarbodiimides.

This third step of carbodiimidization may be carried out under conventional conditions well-known to those skilled in the art. In certain embodiments, the carbodiimidication reaction is carried out under dry conditions in a polar solvent such as ethylacetate, acetone, methyl isobutyl ketone, and the like. Suitable reaction temperatures will be easily determined by those skilled in the art based on the particular reagents, solvents, and catalysts being used. While it is not practical to enumerate particular temperatures suitable for all situations, generally suitable temperatures are 70° C. to 100° C. In certain embodiments, the reaction is carried out at a temperature of 75° C. to 95° C.

In one embodiment of the three step process, steps 2 and 3 are carried out at the same time. That is, the condensation reaction (step 2) and carbodiimide reaction (step 3) are done at the same time.

In certain embodiments, a polycarbodiimide compound has the following formula:

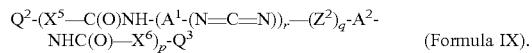  (Formula IX).

In Formula IX, $X^5$ and $X^6$ are independently S, —NH, —N($R^{11}$), or O, wherein $R^{11}$ is a hydrocarbon group (e.g., an alkyl group) having 1 to 20 carbon atoms. In certain embodiments of Formula IX, $X^5$ and $X^6$ are independently —NH, —N($R^{11}$), or O, wherein $R^{11}$ is a hydrocarbon group (e.g., an alkyl group) having 1 to 20 carbon atoms. Examples of $R^{11}$ alkyl groups include methyl, ethyl, octyl, and octadecyl. In certain embodiments of Formula IX, $X^5$ and $X^6$ are both O (oxygen).

In Formula IX, $A^1$ and $A^2$ are independently the residue of an organic diisocyanate compound obtained by removing the isocyanate groups therefrom. Examples of such diisocyanates include 4,4'-methylenebis(phenyl isocyanate), polymethylene polyphenylisocyanate, or 2,4-toluene diisocyanate. In certain embodiments of Formula IX, $A^1$ and $A^2$ are independently the residue of an organic diisocyanate compound selected from 4,4'-methylenebis(phenyl isocyanate), polymethylene polyphenylisocyanate, and a mixture thereof. In this context, a "residue" is obtained by removing the isocyanate groups from the organic diisocyanate compounds. In certain embodiments of Formula IX, $A^1$ and $A^2$ are independently the residue of 4,4'-methylenebis(phenyl isocyanate) obtained by removing the isocyanate groups therefrom.

In Formula IX, q=0 or 1. In certain embodiments, q is 0.

In Formula IX, p is an integer from 1 to 10. In certain embodiments, p is 1.

In Formula IX, r is an integer from 1 to 20. In certain embodiments of Formula IX, r is an integer from 2 to 10. In certain embodiments, r is an integer from 4 to 10.

In Formula IX, $Z^2$ is a divalent group of the formula:

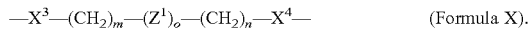

$$-X^3-(CH_2)_m-(Z^1)_o-(CH_2)_n-X^4- \quad \text{(Formula X)}.$$

In Formula X (which is the divalent $Z^2$ group of Formula IX), $X^3$ and $X^4$ are independently S, —NH, —N($R^{11}$), or O, wherein $R^{11}$ is a hydrocarbon group (e.g., an alkyl group) having 1 to 20 carbon atoms. Examples of $R^{11}$ alkyl groups include methyl, ethyl, octyl, and octadecyl.

In Formula X (which is the divalent $Z^2$ group of Formula IX), m and n are independently integers from 1 to 12 (and in certain embodiments, 1 to 10).

In Formula X (which is the divalent $Z^2$ group of Formula IX), o is 0 or 1.

In Formula X (which is the divalent $Z^2$ group of Formula IX), $Z^1$ is selected from: a branched or straight chain alkylene group having 1 to 20 carbon atoms; a divalent polydimethylsiloxane group comprising 2 to 100 dimethylsiloxane repeating units; a divalent alkylene oxide group comprising 2 to 100 alkylene oxide repeating units; and a combination thereof.

In Formula IX, $Q^2$ and $Q^3$ are independently selected from: a hydrocarbon group having at least 2 carbon atoms (and in certain embodiments up to 60 carbon atoms, or up to 30 carbon atoms); and a group having the formula:

$$-(CH_2)_a-S-U \quad \text{(Formula XI)}$$

with the proviso that $Q^2$ and $Q^3$ cannot both be a hydrocarbon group having at least 2 carbon atoms.

In certain embodiments of compounds of Formula IX, $Q^2$ and $Q^3$ are independently a hydrocarbon group having at least 2 carbon atoms (and in certain embodiments up to 60 carbon atoms, or up to 30 carbon atoms). Examples of such hydrocarbon groups include an octadecyl (C18) group, an arachidyl (C20) group, a behenyl (C22) group, a lignoceryl (C24) group, a ceryl (C26) group, a montanyl (C28) group, or a myricyl (C30) group, a 2-dodecylhexadecyl (C28 branched) group, a 2-tetradecyloctadecyl (C32 branched) group, long chain linear alkyl groups of 30 to 60 carbon atoms (available under the UNILIN brand). In certain embodiments, such hydrocarbon groups are selected from an octadecyl group, a behenyl group, and a 2-tetradecyloctadecyl group.

In certain embodiments of compounds of Formula IX, $Q^2$ and $Q^3$ are independently a group having the formula —$(CH_2)_a$—S—U (Formula XI).

In Formula XI (which is one of the $Q^2$ and/or $Q^3$ groups of Formula IX), "a" is an integer from 1 to 10. In certain embodiments, the value of "a" is 2.

In Formula XI (which is one of the $Q^2$ and/or $Q^3$ groups of Formula IX), S is sulfur In Formula XI (which is one of the $Q^2$ and/or $Q^3$ groups of Formula IX), U is selected from: an oligomer comprising 2 to 20 repeating units of (meth)acrylate monomers, each repeating unit independently comprising an alkyl group having at least 16 carbon atoms (and in certain embodiments up to 60 carbon atoms, or up to 30 carbon atoms); an oligomer comprising 2 to 20 repeating units of urethane-containing (meth)acrylate monomers, each repeating unit independently comprising an alkyl group having at least 16 carbon atoms (and in certain embodiments up to 60 carbon atoms, or up to 30 carbon atoms); an oligomer comprising 2 to 20 repeating units of urea-containing (meth)acrylate monomers, each repeating unit independently comprising an alkyl group having at least 16 carbon atoms (and in certain embodiments up to 60 carbon atoms, or up to 30 carbon atoms); and a combination thereof.

In Formula XI (which is one of the $Q^2$ and/or $Q^3$ groups of Formula IX), U is an oligomer comprising 2 to 20 repeating units of monomers selected from: octadecyl(meth)acrylate; behenyl(meth)acrylate; a (meth)acrylate having up to 30 carbon atoms in a hydrocarbon chain; the reaction product of octadecyl isocyanate with 4-hydroxybutyl (meth)acrylate; the reaction product of octadecyl isocyanate with 2-hydroxyethyl (meth)acrylate; the reaction product of octadecyl isocyanate with 3-hydroxypropyl (meth)acrylate; the reaction product of octadecanol with 2-isocyanatoethyl (meth)acrylate; the reaction product of behenyl alcohol with 2-isocyantoethyl (meth)acrylate; the reaction product of 2,4-toluenediisocyanate with octadecanol and 2-hydroxyethyl (meth)acrylate; the reaction product of 2,4-toluenediisocyanate with behenyl alcohol and 2-hydroxyethyl (meth)acrylate; the reaction product of 2,4-toluenediisocyanate with octadecanol and 4-hydroxybutyl (meth)acrylate; the reaction product of 2,4-toluenediisocyanate with behenyl alcohol and 4-hydroxybutyl (meth)acrylate; the reaction product of 2,4-toluenediisocyanate with octadecanol and 3-hydroxypropyl (meth)acrylate; the reaction product of 2,4-toluenediisocyanate with behenyl alcohol and 3-hydroxypropyl (meth)acrylate; and a combination thereof.

In Formula XI (which is one of the $Q^2$ and/or $Q^3$ groups of Formula IX), U is an oligomer comprising 2 to 20 repeating units of monomers selected from octadecyl(meth)acrylate, behenyl(meth)acrylate, 2-tetradecyloctadecyl (meth)acrylate, and a combination thereof.

In certain embodiments, U is an oligomer of 4 to 20 repeating units of octadecylacrylate.

In certain embodiments, U is an oligomer of 4 to 20 repeating units of the reaction product of octadecanol with 2-isocyanato ethyl (meth)acrylate.

In certain embodiments, a polycarbodiimide compound of Formula IX may be used in a treating composition or method, wherein: $X^5$ and $X^6$ are each O; $A^1$ and $A^2$ are each the residue of 4,4'-methylenebis(phenyl isocyanate) obtained by removing the isocyanate groups therefrom; q=0; p is 1; r is an integer from 4 to 10; and $Q^2$ and $Q^3$ independently have the formula $(CH_2)_a$—S—U (Formula XI), wherein a is 2, S is sulfur, and U is an oligomer of 4 to 20 repeating units of octadecylacrylate.

In certain embodiments, a polycarbodiimide compound of Formula IX may be used in a treating composition or method, wherein: $X^5$ and $X^6$ are each O; $A^1$ and $A^2$ are each the residue of 4,4'-methylenebis(phenyl isocyanate) obtained by removing the isocyanate groups therefrom; q=0; p is 1; r is an integer from 4 to 10; and $Q^2$ and $Q^3$ independently have the formula $(CH_2)_a$—S—U (Formula XI), wherein a is 2, S is sulfur, and U is an oligomer of 4 to 20 repeating units of the reaction product of octadecanol with 2-isocyanato ethyl (meth)acrylate.

Specific examples of polycarbodiimide compounds of Formula IX may be derived from a carbodiimidization reaction of an oligomer that includes at least one isocyanate end group and at least two repeating units, wherein each of the repeating units includes at least one hydrocarbon group having at least 16 carbon atoms. Such oligomer with isocyanate end groups may be made from a diisocyanate and an acrylate oligomer in the presence of a catalyst that causes subsequent carbodiimidization. In such examples, the oligomer that includes at least one isocyanate end group and at least two repeating units is formed in the reaction mixture without being isolated (i.e., it is formed in situ).

For example, a polycarbodiimide compound may be derived from a carbodiimidization reaction of a carbodiimidization reaction mixture comprising 4,4'-methylenebis (phenyl isocyanate) (MDI) and a functionalized acrylate oligomer. Such isocyanate and functionalized acrylate oligomer may be present in the reaction mixture in a molar ratio of 2:1 to 10:1. Examples of this are described in Examples 1, 2, and 6 of the Examples Section.

Examples of functionalized acrylate oligomers used to make the isocyanate-containing oligomer include those made, for example, by reaction of an oligomerization reaction mixture comprising: (1) mercaptoethanol and octadecyl acrylate in a molar ratio of 1:4 to 1:20 (this reaction is exemplified by Example 1 in the Examples Section); (2) mercaptoethanol and a reaction product of octadecyl isocyanate (i.e., stearyl isocyanate) with 2-hydroxyethyl (meth) acrylate, wherein the mercaptoethanol and the reaction product (e.g., $C_{18}H_{37}$—NHC(O)O—$CH_2CH_2$—OC(O) CH=$CH_2$) are reacted in a molar ratio of 1:4 to 1:20 (this reaction is exemplified in Example 2 in the Examples Section); and (3) mercaptoethanol and a reaction product of octadecanol (i.e., stearyl alcohol) with 2-isocyanato ethyl (meth)acrylate, wherein the mercaptoethanol and the reaction product (a monomer of Formula III, $R^4$—$X^1$—C(O) NH-$L^2$-OC(O)C($R^2$)=$CH_2$, wherein $R^4$ is stearyl, $X^1$=O, $L^2$=ethyl, and $R^2$=H) are reacted in a molar ratio of 1:4 to 1:20 (this reaction is exemplified in Example 6 in the Examples Section).

Treating Compositions

A treating composition that includes one or more polycarbodiimide compounds, and optionally one or more paraffin waxes, is preferably used as an aqueous composition, in particular, an aqueous dispersion in water.

After completion of the carbodiimidization reaction, the final reaction mixture may be dispersed in water using a surfactant or mixture of surfactants in an amount sufficient to stabilize the dispersion. The polycarbodiimide, or mixture thereof, is usually made in solution in a solvent. The resultant polycarbodiimide, or mixture thereof, is then dispersed in water through vigorously mixing and homogenizing with the help of a surfactant or emulsifier, and subsequent homogenization, for example, by a Manton Gaulin homogenizer or ultrasound homogenizer. An organic solvent-free dispersion can be obtained by subsequent distillation of the solvent.

A typical dispersion will contain water in an amount of 70 to 20,000 parts by weight based on 100 parts by weight of carbodiimide compound or mixture of carbodiimide compounds. The surfactant or mixture of surfactants is preferably present in an amount of 1 to 25 parts by weight, or 5 to 15 parts by weight, based on 100 parts by weight of the carbodiimide compound or mixture of carbodiimide compounds.

Treating compositions of the present disclosure can include conventional cationic, nonionic, anionic, and/or zwitterionic (i.e., amphoteric) surfactants (i.e., emulsifiers). A mixture of surfactants may be used, e.g., containing nonionic and ionic surfactants. Suitable nonionic surfactants can have high or low HLB values, such as TERGITOL's, TWEEN's, and the like. Suitable cationic surfactants include mono- or bi-tail ammonium salts. Suitable anionic surfactants include sulfonic and carboxylic aliphatic compounds and their salts, such as sodiumdodecylbenzenesulphonate (available from Rhodia, France), and the like. Suitable amphoteric surfactants include cocobetaines, sulphobetaines, amine-oxides, and the like.

In certain embodiments, surfactants suitable for use in the treating compositions of the present disclosure are described in International Publication No. WO 2013/162704.

Various methods can be used for making treating compositions that include one or more paraffin waxes and one or more polycarbodiimides (PCD's) of the present disclosure.

In one method, a paraffin wax is dissolved in a solvent, or mixture of solvents, to form a first solution (A). One or more surfactants are dissolved in water to form a second solution (B). Solutions A and B are then mixed together and emulsified to form a wax emulsion. Then, a wax emulsion is mixed with a PCD emulsion, formed as described above, to form the final treating composition with one or more paraffin waxes and one or more PCD's.

In a second method, a paraffin wax is dissolved in a solvent, or mixture of solvents, to form a first solution (A). One or more PCD's in the solvent(s) in which prepared (solution C) are mixed with solution A to form a solvent-based mixture (D). One or more surfactants are dissolved in water to form a solution (B). Solutions D and B are then mixed together and emulsified to form a wax/PCD co-emulsion. Then, a wax emulsion is mixed with a PCD emulsion, formed as described above, to form the final treating composition with one or more paraffin waxes and one or more PCD's.

Also, treating compositions of the present disclosure may further include one or more of a coalescing solvent, an anti-freeze solvent, an emulsifier, or a stabilizer against one or more microorganisms.

Exemplary Embodiments

Embodiment 1 is a method of treating a fibrous substrate, the method comprising applying a fluorine-free treating composition in an amount sufficient to make the fibrous substrate water repellent (and in certain embodiments, durably water repellent), wherein the treating composition comprises:

at least one polycarbodiimide compound derived from a carbodiimidization reaction of a carbodiimidization reaction mixture comprising at least one oligomer, wherein the oligomer comprises at least one isocyanate end group and at least two repeating units, wherein each of the at least two repeating units comprises at least one hydrocarbon group having at least 16 carbon atoms (and in certain embodiments up to 60 carbon atoms, or up to 30 carbon atoms) (in certain embodiments, the oligomer is made from at least 70 wt-% (meth)acrylate monomers having a hydrocarbon group having at least 16 carbon atoms, whereas in certain embodiments, the oligomer is made from only (meth)acrylate monomers having a hydrocarbon group having at least 16 carbon atoms).

Embodiment 2 is the method of embodiment 1 wherein the oligomer comprising at least one isocyanate end group and at least two repeating units of at least one (meth)acrylate monomer, wherein the (meth)acrylate monomer has the following formula:

$$R^1\text{—OC(O)C}(R^2)\text{=}CH_2 \quad \text{(Formula I)}$$

wherein:
R¹ comprises a hydrocarbon group having at least 16 carbon atoms (and in certain embodiments up to 60 carbon atoms, or up to 30 carbon atoms); and
R² is H or CH₃.

Embodiment 3 is the method of embodiment 2 wherein the (meth)acrylate monomer of Formula I is selected from one or more (meth)acrylate monomers of the following formulas:

$$R^3\text{—NHC(O)O-L}^1\text{-OC(O)C(R}^2\text{)}=CH_2 \quad \text{(Formula II);}$$

$$R^4\text{—X}^1\text{—C(O)NH-L}^2\text{-OC(O)C(R}^2\text{)}=CH_2 \quad \text{(Formula III); or}$$

$$R^5\text{—X}^2\text{—C(O)NH-Q}^1\text{-NHC(O)O-L}^3\text{-OC(O)C(R}^2\text{)}=CH_2 \quad \text{(Formula IV);}$$

wherein:
each $R^2$ is independently H or CH₃;
$R^3$, $R^4$, and $R^5$ are independently a hydrocarbon group having 16 to 60 carbon atoms (in certain embodiments, $R^4$ and $R^5$ are branched);
$L^1$, $L^2$, and $L^3$ are independently a branched or straight chain alkylene group having 2 to 10 carbon atoms, an arylene group (in certain embodiments, an arylene group having 5 to 12 carbon atoms), or a combination thereof;
$X^1$ and $X^2$ are independently S, —NH, —N($R^6$), or O, wherein $R^6$ is a hydrocarbon group (in certain embodiments, an alkyl group) having 1 to 20 carbon atoms; and
$Q^1$ is a divalent isocyanate residue.

Embodiment 4 is the method of any one of embodiments 1 through 3 wherein the polycarbodiimide is further prepared from a reaction mixture (either in a carbodimidization reaction mixture (step 3) or a condensation-reaction mixture (step 2)) that includes at least one isocyanate-reactive difunctional compound having the following formula:

$$H\text{—}X^3\text{—(CH}_2)_m\text{—(Z}^1)_o\text{—(CH}_2)_n\text{—X}^4\text{—H} \quad \text{(Formula VIII)}$$

wherein:
$X^3$ and $X^4$ are independently S, —NH, —N($R^{10}$), or O, wherein $R^{10}$ is a hydrocarbon group (in certain embodiments, an alkyl group) having 1 to 20 carbon atoms;
m and n are independently integers from 1 to 12 (and in certain embodiments, 1 to 10);
o is 0 or 1; and
$Z^1$ is selected from:
a branched or straight chain alkylene group having 1 to 20 carbon atoms;
a divalent polydimethylsiloxane group comprising 2 to 100 dimethylsiloxane repeating units;
a divalent alkylene oxide group comprising 2 to 100 alkylene oxide repeating units; and
a combination thereof.

Embodiment 5 is the method of embodiment 1 comprising applying a fluorine-free composition comprising at least one polycarbodiimide compound of the formula:

$$Q^2\text{-(}X^5\text{—C(O)NH-(A}^1\text{-(N=C=N))}_r\text{—(Z}^2)_q\text{-A}^2\text{-NHC(O)—}X^6)_p\text{-Q}^3 \quad \text{(Formula IX)}$$

wherein:
$X^5$ and $X^6$ are independently S, —NH, —N($R^{11}$), or O, wherein $R^{11}$ is a hydrocarbon group (in certain embodiments, an alkyl group) having 1 to 20 carbon atoms;
$A^1$ and $A^2$ are independently the residue of an organic diisocyanate compound obtained by removing the isocyanate groups therefrom;
q=0 or 1;
p is an integer from 1 to 10;
r is an integer from 1 to 20;
$Z^2$ is a divalent group of the formula:

$$\text{—}X^3\text{—(CH}_2)_m\text{—(Z}^1)_o\text{—(CH}_2)_n\text{—X}^4\text{—} \quad \text{(Formula X)}$$

wherein:
$X^3$ and $X^4$ are independently S, —NH, —N($R^{11}$), or O, wherein $R^{11}$ is a hydrocarbon group (in certain embodiments, an alkyl group) having 1 to 20 carbon atoms;
m and n are independently integers from 1 to 12 (and in certain embodiments, 1 to 10);
o is 0 or 1; and
$Z^1$ is selected from:
a branched or straight chain alkylene group having 1 to 20 carbon atoms;
a divalent polydimethylsiloxane group comprising 2 to 100 dimethylsiloxane repeating units;
a divalent alkylene oxide group comprising 2 to 100 alkylene oxide repeating units; and
a combination thereof;
$Q^2$ and $Q^3$ are independently selected from:
a hydrocarbon group having at least 2 carbon atoms (and in certain embodiments up to 60 carbon atoms, or up to 30 carbon atoms); and
a group having the formula:

$$\text{—(CH}_2)_a\text{—S—U} \quad \text{(Formula XI)}$$

wherein:
a is an integer from 1 to 10;
S is sulfur; and
U is selected from:
an oligomer comprising 2 to 20 repeating units of (meth)acrylate monomers, each repeating unit independently comprising an alkyl group having at least 16 carbon atoms (and in certain embodiments up to 60 carbon atoms, or up to 30 carbon atoms);
an oligomer comprising 2 to 20 repeating units of urethane-containing (meth)acrylate monomers, each repeating unit independently comprising an alkyl group having at least 16 carbon atoms (and in certain embodiments up to 60 carbon atoms, or up to 30 carbon atoms);
an oligomer comprising 2 to 20 repeating units of urea-containing (meth)acrylate monomers, each repeating unit independently comprising an alkyl group having at least 16 carbon atoms (and in certain embodiments up to 60 carbon atoms, or up to 30 carbon atoms); and
a combination thereof;
with the proviso that $Q^2$ and $Q^3$ cannot both be a hydrocarbon group having at least 2 carbon atoms.

Embodiment 6 is the method of embodiment 5 wherein $X^5$ and $X^6$ are independently —NH, —N($R^{11}$), or O, wherein $R^{11}$ is an alkyl group having 1 to 20 carbon atoms.

Embodiment 7 is the method of embodiment 5 or 6 wherein $A^1$ and $A^2$ are independently the residue of an organic diisocyanate compound selected from 4,4'-methylenebis(phenyl isocyanate), polymethylene polyphenylisocyanate, and a mixture thereof.

Embodiment 8 is the method of any one of embodiments 5 through 7 wherein r is an integer from 2 to 10.

Embodiment 9 is the method of any one of embodiments 5 through 8 wherein $Q^2$ and $Q^3$ are independently a hydrocarbon group having at least 2 carbon atoms (and in certain embodiments up to 60 carbon atoms, or up to 30 carbon atoms).

Embodiment 10 is the method of embodiment 9 wherein $Q^2$ and $Q^3$ are independently a hydrocarbon group selected from an octadecyl group, a behenyl group, and a 2-tetradecyloctadecyl group.

Embodiment 11 is the method of any one of embodiments 5 through 8 wherein $Q^2$ and $Q^3$ are independently a group having the formula —$(CH_2)_a$—S—U (Formula XI).

Embodiment 12 is the method of embodiment 11 wherein U is an oligomer comprising 2 to 20 repeating units of monomers selected from: octadecyl(meth)acrylate; behenyl (meth)acrylate; a (meth)acrylate having up to 30 carbon atoms in a hydrocarbon chain; the reaction product of octadecyl isocyanate with 4-hydroxybutyl (meth)acrylate; the reaction product of octadecyl isocyanate with 2-hydroxyethyl (meth)acrylate; the reaction product of octadecyl isocyanate with 3-hydroxypropyl (meth)acrylate; the reaction product of octadecanol with 2-isocyanato ethyl (meth)acrylate; the reaction product of behenyl alcohol with 2-isocyanto ethyl (meth)acrylate; the reaction product of 2,4-toluenediisocyanate with octadecanol and 2-hydroxyethyl (meth)acrylate; the reaction product of 2,4-toluenediisocyanate with behenyl alcohol and 2-hydroxyethyl (meth)acrylate; the reaction product of 2,4-toluenediisocyanate with octadecanol and 4-hydroxybutyl (meth)acrylate; the reaction product of 2,4-toluenediisocyanate with behenyl alcohol and 4-hydroxybutyl (meth)acrylate; the reaction product of 2,4-toluenediisocyanate with octadecanol and 3-hydroxypropyl (meth)acrylate; the reaction product of 2,4-toluenediisocyanate with behenyl alcohol and 3-hydroxypropyl (meth) acrylate; and a combination thereof.

Embodiment 13 is the method of embodiment 12 wherein U is an oligomer comprising 2 to 20 repeating units of monomers selected from octadecyl(meth)acrylate, behenyl (meth)acrylate, 2-tetradecyloctadecyl(meth)acrylate, and a combination thereof.

Embodiment 14 is the method of embodiment 5 comprising applying a fluorine-free composition comprising at least one polycarbodiimide compound of the formula:

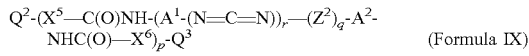

(Formula IX)

wherein:
$X^5$ and $X^6$ are each O;
$A^1$ and $A^2$ are each the residue of 4,4'-methylenebis (phenyl isocyanate) obtained by removing the isocyanate groups therefrom;
q=0;
p is 1;
r is an integer from 4 to 10;
$Q^2$ and $Q^3$ independently have the formula:

(Formula XI)

wherein:
a is 2;
S is sulfur; and
U is an oligomer of 4 to 20 repeating units of octadecylacrylate.

Embodiment 15 is the method of embodiment 5 comprising applying a fluorine-free composition comprising at least one polycarbodiimide compound of the formula:

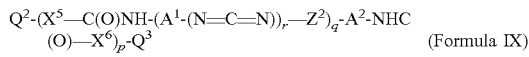

(Formula IX)

wherein:
$X^5$ and $X^6$ are each O;
$A^1$ and $A^2$ are each the residue of 4,4'-methylenebis (phenyl isocyanate) obtained by removing the isocyanate groups therefrom;
q=0;
p is 1;
r is an integer from 4 to 10;
$Q^2$ and $Q^3$ independently have the formula:

 (Formula XI)

wherein:
a is 2;
S is sulfur; and
U is an oligomer of 4 to 20 repeating units of the reaction product of octadecanol with 2-isocyanato ethyl (meth)acrylate.

Embodiment 16 is the method of embodiment 1 wherein the treating composition comprises:
at least one polycarbodiimide compound derived from a carbodiimidization reaction of a carbodiimidization reaction mixture comprising 4,4'-methylenebis(phenyl isocyanate) and an acrylate oligomer in a molar ratio of 2:1 to 10:1, wherein the acrylate oligomer is made by reaction of an oligomerization reaction mixture comprising mercaptoethanol and octadecylacrylate in a molar ratio of 1:4 to 1:20.

Embodiment 17 is the method of embodiment 1 wherein the treating composition comprises:
at least one polycarbodiimide compound derived from a carbodiimidization reaction of a carbodiimidization reaction mixture comprising 4,4'-methylenebis(phenyl isocyanate) and an acrylate oligomer in a molar ratio of 2:1 to 10:1, wherein the acrylate oligomer is made by reaction of an oligomerization reaction mixture comprising mercaptoethanol and a reaction product of octadecyl isocyanate with 2-hydroxyethyl (meth)acrylate, wherein the mercaptoethanol and the reaction product are reacted in a molar ratio of 1:4 to 1:20.

Embodiment 18 is the method of embodiment 1 wherein the treating composition comprises:
at least one polycarbodiimide compound derived from a carbodiimidization reaction of a carbodiimidization reaction mixture comprising 4,4'-methylenebis(phenyl isocyanate) and an acrylate oligomer in a molar ratio of 2:1 to 10:1, wherein the acrylate oligomer is made by reaction of an oligomerization reaction mixture comprising mercaptoethanol and a reaction product of octadecanol with 2-isocyanato ethyl (meth)acrylate, wherein the mercaptoethanol and the reaction product are reacted in a molar ratio of 1:4 to 1:20.

Embodiment 19 is the method of any one of embodiments 1 through 18 wherein the treating composition further comprises at least one paraffin wax.

Embodiment 20 is the method of embodiment 19 wherein the paraffin wax has a melting point of 40° C. to 70° C.

Embodiment 21 is the method of embodiment 20 wherein the paraffin wax has a melting point of 60° C. to 70° C.

Embodiment 22 is the method of any one of embodiments 19 through 21 wherein the paraffin wax is present in the treating composition in an amount of 30 wt-% to 70 wt-%, and the polycarbodiimide is present in an amount of 30 wt-% to 70 wt-%.

Embodiment 23 is the method of embodiment 22 wherein the paraffin wax is present in the treating composition in an amount of 50 wt-% to 70 wt-%, and the polycarbodiimide is present in an amount of 30 wt-% to 50 wt-%.

Embodiment 24 is the method of any one of embodiments 1 through 23 wherein the fibrous substrate is selected from the group of textile, leather, carpet, paper, and nonwoven fabrics.

Embodiment 25 is the method of any one of embodiments 1 through 24 wherein the treating composition is an aqueous dispersion optionally further comprising one or more of a surfactant, a coalescing solvent, an anti-freeze solvent, an emulsifier, or a stabilizer against one or more microorganisms.

Embodiment 26 is a fluorine-free composition comprising: at least one paraffin wax; and at least one polycarbodiimide compound; wherein the at least one polycarbodiimide compound has at least two hydrocarbon groups, each having at least 16 carbon atoms; or wherein the at least one polycarbodiimide compound is derived from a carbodiimidization reaction of a carbodiimidization reaction mixture comprising at least one oligomer, wherein the oligomer comprises at least one isocyanate end group and at least two repeating units, wherein each of the at least two repeating units comprises at least one hydrocarbon group having at least 16 carbon atoms.

Embodiment 27 is the composition of embodiment 26 wherein the oligomer comprising at least one isocyanate group and at least two repeating units of at least one (meth)acrylate monomer, wherein the (meth)acrylate monomer has the following formula:

$$R^1\text{—OC(O)C}(R^2)\text{=CH}_2 \qquad \text{(Formula I)}$$

wherein:
$R^1$ comprises a hydrocarbon group having at least 16 carbon atoms (and in certain embodiments up to 60 carbon atoms, or up to 30 carbon atoms); and
$R^2$ is H or $CH_3$.

Embodiment 28 is the composition of embodiment 27 wherein the (meth)acrylate monomer of Formula I is selected from one or more (meth)acrylate monomers of the following formulas:

$$R^3\text{—NHC(O)O-L}^1\text{-OC(O)C}(R^2)\text{=CH}_2 \qquad \text{(Formula II);}$$

$$R^4\text{—X}^1\text{—C(O)NH-L}^2\text{-OC(O)C}(R^2)\text{=CH}_2 \qquad \text{(Formula III); or}$$

$$R^5\text{—X}^2\text{—C(O)NH-Q}^1\text{-NHC(O)O-L}^3\text{-OC(O)C}(R^2)\text{=CH}_2 \qquad \text{(Formula IV);}$$

wherein:
each $R^2$ is independently H or $CH_3$;
$R^3$, $R^4$, and $R^5$ are independently a hydrocarbon group having at least 16 carbon atoms (in certain embodiments up to 60 carbon atoms) (in certain embodiments, $R^4$ and $R^5$ are branched);
$L^1$, $L^2$, and $L^3$ are independently a branched or straight chain alkylene group having 2 to 10 carbon atoms, an arylene group (in certain embodiments, an arylene group having 5 to 12 carbon atoms), or a combination thereof;
$X^1$ and $X^2$ are independently S, —NH, —N($R^6$), or O, wherein $R^6$ is a hydrocarbon group (in certain embodiments, an alkyl group) having 1 to 20 carbon atoms; and
$Q^1$ is a divalent isocyanate residue.

Embodiment 29 is the composition of any one of embodiments 26 through 28 wherein the carbodimidization reaction mixture further comprises at least one isocyanate-reactive difunctional compound having the following formula:

$$H\text{—X}^3\text{—(CH}_2)_m\text{—(Z}^1)_o\text{—(CH}_2)_n\text{—X}^4\text{—H} \qquad \text{(Formula VIII)}$$

wherein:
$X^3$ and $X^4$ are independently S, —NH, —N($R^{10}$), or O, wherein $R^{10}$ is a hydrocarbon group (in certain embodiments, an alkyl group) having 1 to 20 carbon atoms;
m and n are independently integers from 1 to 12 (and in certain embodiments, 1 to 10);
o is 0 or 1; and
$Z^1$ is selected from:
 a branched or straight chain alkylene group having 1 to 20 carbon atoms;
 a divalent polydimethylsiloxane group comprising 2 to 100 dimethylsiloxane repeating units;
 a divalent alkylene oxide group comprising 2 to 100 alkylene oxide repeating units; and
 a combination thereof.

Embodiment 30 is the composition of embodiment 26 wherein the polycarbodiimide compound is of the formula:

$$Q^2\text{-(X}^5\text{—C(O)NH-(A}^1\text{-(N=C=N))}_r\text{—Z}^2)_q\text{-A}^2\text{-NHC(O)—X}^6)_p\text{-Q}^3 \qquad \text{(Formula IX)}$$

wherein:
$X^5$ and $X^6$ are independently S, —NH, —N($R^{11}$), or O, wherein $R^{11}$ is a hydrocarbon group (in certain embodiments, an alkyl group) having 1 to 20 carbon atoms;
$A^1$ and $A^2$ are independently the residue of an organic diisocyanate compound obtained by removing the isocyanate groups therefrom;
q=0 or 1;
p is an integer from 1 to 10;
r is an integer from 1 to 20;
$Z^2$ is a divalent group of the formula:

$$\text{—X}^3\text{—(CH}_2)_m\text{—(Z}^1)_o\text{—(CH}_2)_n\text{—X}^4 \qquad \text{(Formula X)}$$

wherein:
 $X^3$ and $X^4$ are independently S, —NH, —N($R^{11}$), or O, wherein $R^{11}$ is a hydrocarbon group (in certain embodiments, an alkyl group) having 1 to 20 carbon atoms;
 m and n are independently integers from 1 to 12 (and in certain embodiments, 1 to 10);
 o is 0 or 1; and
 $Z^1$ is selected from:
  a branched or straight chain alkylene group having 1 to 20 carbon atoms;
  a divalent polydimethylsiloxane group comprising 2 to 100 dimethylsiloxane repeating units;
  a divalent alkylene oxide group comprising 2 to 100 alkylene oxide repeating units; and
  a combination thereof;
$Q^2$ and $Q^3$ are independently selected from:
 a hydrocarbon group having at least 2 carbon atoms (and in certain embodiments up to 60 carbon atoms, or up to 30 carbon atoms); and
 a group having the formula:

$$(CH_2)_a\text{—S—U} \qquad \text{(Formula XI)}$$

wherein:
 a is an integer from 1 to 10;
 S is sulfur; and
 U is selected from:
  an oligomer comprising 2 to 20 repeating units of (meth)acrylate monomers, each repeating unit independently comprising an alkyl group having at least 16 carbon atoms (and in certain embodiments up to 60 carbon atoms, or up to 30 carbon atoms);
  an oligomer comprising 2 to 20 repeating units of urethane-containing (meth)acrylate monomers, each repeating unit independently comprising an alkyl group having at least 16 carbon atoms (and in certain embodiments up to 60 carbon atoms, or up to 30 carbon atoms);
an oligomer comprising 2 to 20 repeating units of urea-containing (meth)acrylate monomers, each repeating unit independently comprising an alkyl group having at least 16 carbon atoms (and in certain embodiments up to 60 carbon atoms, or up to 30 carbon atoms); and
a combination thereof;

with the proviso that $Q^2$ and $Q^3$ cannot both be a hydrocarbon group having at least 2 carbon atoms.

Embodiment 31 is the composition of embodiment 30 wherein $X^5$ and $X^6$ are independently —NH, —N($R^{11}$), or O, wherein $R^{11}$ is an alkyl group having 1 to 20 carbon atoms.

Embodiment 32 is the composition of embodiment 30 or 31 wherein $A^1$ and $A^2$ are independently the residue of an organic diisocyanate compound selected from 4,4'-methylenebis(phenyl isocyanate), polymethylene polyphenylisocyanate, and a mixture thereof.

Embodiment 33 is the composition of any one of embodiments 30 through 32 wherein r is an integer from 2 to 10.

Embodiment 34 is the composition of any one of embodiments 30 through 33 wherein $Q^2$ and $Q^3$ are independently a hydrocarbon group having at least 2 carbon atoms (and in certain embodiments up to 60 carbon atoms, or up to 30 carbon atoms).

Embodiment 35 is the composition of embodiment 34 wherein $Q^2$ and $Q^3$ are independently a hydrocarbon group selected from an octadecyl group, a behenyl group, and a 2-tetradecyloctadecyl group.

Embodiment 36 is the composition of any one of embodiments 30 through 33 wherein $Q^2$ and $Q^3$ are independently a group having the formula —$(CH_2)_a$—S—U (Formula XI).

Embodiment 37 is the composition of embodiment 36 wherein U is an oligomer comprising 2 to 20 repeating units of monomers selected from: octadecyl(meth)acrylate; behenyl(meth)acrylate; a (meth)acrylate having up to 30 carbon atoms in a hydrocarbon chain; the reaction product of octadecyl isocyanate with 4-hydroxybutyl (meth)acrylate; the reaction product of octadecyl isocyanate with 2-hydroxyethyl (meth)acrylate; the reaction product of octadecyl isocyanate with 3-hydroxypropyl (meth)acrylate; the reaction product of octadecanol with 2-isocyanato ethyl (meth)acrylate; the reaction product of behenyl alcohol with 2-isocyanto ethyl (meth)acrylate; the reaction product of 2,4-toluenediisocyanate with octadecanol and 2-hydroxyethyl (meth)acrylate; the reaction product of 2,4-toluenediisocyanate with behenyl alcohol and 2-hydroxyethyl (meth)acrylate; the reaction product of 2,4-toluenediisocyanate with octadecanol and 4-hydroxybutyl (meth)acrylate; the reaction product of 2,4-toluenediisocyanate with behenyl alcohol and 4-hydroxybutyl (meth)acrylate; the reaction product of 2,4-toluenediisocyanate with octadecanol and 3-hydroxypropyl (meth)acrylate; the reaction product of 2,4-toluenediisocyanate with behenyl alcohol and 3-hydroxypropyl (meth)acrylate; and a combination thereof.

Embodiment 38 is the composition of embodiment 37 wherein U is an oligomer comprising 2 to 20 repeating units of monomers selected from octadecyl(meth)acrylate, behenyl(meth)acrylate, 2-tetradecyloctadecyl(meth)acrylate, and a combination thereof.

Embodiment 39 is the composition of embodiment 30 wherein the polycarbodiimide compound is of the formula:

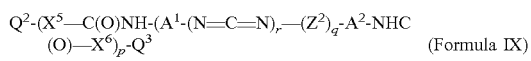  (Formula IX)

wherein:
$X^5$ and $X^6$ are each O;
$A^1$ and $A^2$ are each the residue of 4,4'-methylenebis(phenyl isocyanate) obtained by removing the isocyanate groups therefrom;
q=0;
p is 1;
r is an integer from 4 to 10;
$Q^2$ and $Q^3$ independently have the formula:

  (Formula XI)

wherein:
a is 2;
S is sulfur; and
U is an oligomer of 4 to 20 repeating units of octadecylacrylate.

Embodiment 40 is the composition of embodiment 30 wherein the polycarbodiimide compound is of the formula:

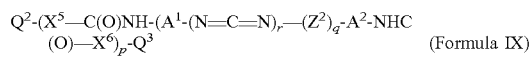  (Formula IX)

wherein:
$X^5$ and $X^6$ are each O;
$A^1$ and $A^2$ are each the residue of 4,4'-methylenebis(phenyl isocyanate) obtained by removing the isocyanate groups therefrom;
q=0;
p is 1;
r is an integer from 4 to 10;
$Q^2$ and $Q^3$ independently have the formula:

  (Formula XI)

wherein:
a is 2;
S is sulfur; and
U is an oligomer of 4 to 20 repeating units of the reaction product of octadecanol with 2-isocyanato ethyl (meth)acrylate.

Embodiment 41 is the composition of embodiment 26 wherein the polycarbodiimide compound is derived from a carbodiimidization reaction of a carbodiimidization reaction mixture comprising 4,4'-methylenebis(phenyl isocyanate) and an acrylate oligomer in a molar ratio of 2:1 to 10:1, wherein the acrylate oligomer is made by reaction of an oligomerization reaction mixture comprising mercaptoethanol and octadecylacrylate in a molar ratio of 1:4 to 1:20.

Embodiment 42 is the composition of embodiment 26 wherein the polycarbodiimide compound is derived from a carbodiimidization reaction of a carbodiimidization reaction mixture comprising 4,4'-methylenebis(phenyl isocyanate) and an acrylate oligomer in a molar ratio of 2:1 to 10:1, wherein the acrylate oligomer is made by reaction of an oligomerization reaction mixture comprising mercaptoethanol and a reaction product of octadecyl isocyanate with 2-hydroxyethyl (meth)acrylate, wherein the mercaptoethanol and the reaction product are reacted in a molar ratio of 1:4 to 1:20.

Embodiment 43 is the composition of embodiment 26 wherein the polycarbodiimide compound is derived from a carbodiimidization reaction of a carbodiimidization reaction mixture comprising 4,4'-methylenebis(phenyl isocyanate) and an acrylate oligomer in a molar ratio of 2:1 to 10:1, wherein the acrylate oligomer is made by reaction of an oligomerization reaction mixture comprising mercaptoethanol and a reaction product of octadecanol with 2-isocyanato ethyl (meth)acrylate, wherein the mercaptoethanol and the reaction product are reacted in a molar ratio of 1:4 to 1:20.

Embodiment 44 is the composition of any one of embodiments 26 through 43 wherein the paraffin wax has a melting point of 40° C. to 70° C.

Embodiment 45 is the composition of embodiment 44 wherein the paraffin wax has a melting point of 60° C. to 70° C.

Embodiment 46 is the composition of any one of embodiments 26 through 45 wherein the paraffin wax is present in the treating composition in an amount of 30 wt-% to 70 wt-%, and the polycarbodiimide is present in an amount of 30 wt-% to 70 wt-%.

Embodiment 47 is the composition of embodiment 46 wherein the paraffin wax is present in the treating composition in an amount of 50 wt-% to 70 wt-%, and the polycarbodiimide is present in an amount of 30 wt-% to 50 wt-%.

Embodiment 48 is the composition of any one of embodiments 26 through 47 wherein the treating composition is an aqueous dispersion optionally further comprising one or more of a surfactant, a coalescing solvent, an anti-freeze solvent, an emulsifier, or a stabilizer against one or more microorganisms.

Embodiment 49 is a fibrous substrate treated by the method of any one of embodiments 1 through 25.

Embodiment 50 is the fibrous substrate of embodiment 49 which is selected from the group of textile, leather, carpet, paper, and nonwoven fabrics.

EXAMPLES

Objects and advantages of this invention are further illustrated by the following examples, but the particular materials and amounts thereof recited in these examples, as well as other conditions and details, should not be construed to unduly limit this invention. These examples are merely for illustrative purposes only and are not meant to be limiting on the scope of the appended claims.

Materials List

| Material | Description | Source |
|---|---|---|
| Acrylic acid | Acrylic acid, monomer | Sigma-Aldrich, Belgium |
| ODA | octadecylacrylate, monomer | Sigma-Aldrich, Belgium |
| iBMA | isobutyl methacrylate, monomer | Sigma-Aldrich, Belgium |
| 2-mercaptoethanol | 2-mercaptoethanol, chain transfer agent | Sigma-Aldrich, Belgium |
| V-59 | 2,2'-Azobis(2-methyl-butyronitrile), initiator | Commercially available under the trade designation "VAZO V-59" from Wako Pure Chemical Industries, Ltd., Germany |
| VAZO-67 | Azonitrile free radical initiator | Commercially available under the trade name "VAZO-67" from DuPont, Wilmington, DE |
| ethylacetate | ethylacetate, solvent | Sigma-Aldrich, Belgium |
| toluene | toluene, solvent | Sigma-Aldrich, Belgium |
| MIBK | Methyl isobutyl ketone, solvent | Honeywell, Morristown, NJ |
| SA | Stearyl alcohol (i.e., octadecanol), reactant | Sigma-Aldrich, Belgium |
| Isostearyl alcohol | Isostearyl alcohol, reactant | Sigma-Aldrich, Belgium |
| PAPI | Low Viscosity Poly-methylene Polyphenyl-isocyanate | Commercially available under the trade designation "Voronate M 220" from Dow Chemical, Netherlands |
| methanesulfonic acid | methanesulfonic acid | Sigma-Aldrich, Belgium |
| MEHQ | Mono methylether of hydroquinone | Sigma-Aldrich, Belgium |
| DBTDL | Dibutyltin dilaurate, catalyst | Sigma-Aldrich, Belgium |
| AOI | isocyanato ethyl acrylate | Showa Denko, Japan |
| Brij S2 | Diethylene glycol octadecyl ether, nonionic emulsfier | Commercially available under the trade designation "BRIJ S2" from Croda, East Yorkshire, UK |
| Brij S20 | Polyoxyethylene (20) stearyl ether, nonionic emulsifier | Commercially available under the trade designation "BRIJ S20" from Croda, East Yorkshire, UK |
| Armocare VGH-70 | Ester based quaternary, emulsfier | Commercially available under the trade designation "Armocare VGH-70" from Akzo Nobel, Stenungsund, Sweden |
| Ethoquad C-12 | Quaternized coco amine ethoxylate, emulsifier | Commercially available under the trade designation "Ethoquad C-12" from Akzo Nobel, Stenungsund, Sweden |
| Tergitol TMN-6 | Nonionic emulsifier | Dow Chemical, Midland, MI |
| Tergitol 15-S-30 | Nonionic emulsifier | Dow Chemical, Midland, MI |
| stearyl isocyanate | octadecyl isocyanate | Sigma-Aldrich, Belgium |
| 2-hydroxyethyl acrylate | 2-hydroxyethyl acrylate, monomer | Sigma-Aldrich, Belgium |
| Unilin 350 | Fully saturated, long chain, linear primary alcohol with a hydroxyl number of 129, reactant | Commercially available under the trade designation "UNILIN 350" from Baker Hughes, France |
| MPPO | 3-methyl-1-phenyl-2-phospholene 1-oxide, 85% technical grade, carbodiimidization catalyst | Sigma-Aldrich, Belgium |
| MDI | 4,4'-methylenebis(phenyl isocyanate) | Sigma-Aldrich, Belgium |
| Bees wax | A solid bees wax | Commercially available under the trade designation "HP763" from Hase Petroleum Wax Co., Arlington Hts, IL |
| Montan wax | A solid montan wax | Commercially available under the trade designation "LICOWAX E P" from Clariant, Charlotte, NC |
| PE wax | A polyethylene wax emulsion (62.7 % solids) | Commercially available under the trade designation "LUBA-print 185/F" from Munzing, Bloomfield, NJ |
| Carnauba | A carnauba wax emulsion (40.5% solids) | Commercially available under the trade designation "LUBA-print 434" from Munzing, Bloomfield, NJ |
| Paraffin 1 | A solid paraffin wax | Commercially available under the trade designation "EXC0084" from Michelman Inc., Cincinatti, Ohio |

-continued

Materials List

| Material | Description | Source |
|---|---|---|
| Paraffin 2 | Cationic paraffin wax emulsion (50% solids) | Commercially available under the trade designation "ME 73950" from Michelman Inc., Cincinatti, Ohio |
| PES Microfiber | Polyester fabric | Chyang Sheng Dyeing and Finishing Company Ltd., Taiwan |
| NTD | Taslan Dobby Nylon 115 g/m². Fabric characterized by manufacturer as 70D*160D/166T*83T. Dyed and prepared for finishing | China |
| PPP | Poly Pongee Polyester. 84 g/m². Fabric characterized by manufacturer as 75D*75D/145T*90T Dyed and prepared for finishing | China |
| PA Microfiber | Polyamide fabric, style 6145 | Sofinal NV, Belgium |

Test Methods

Spray Rating (SR)

The spray rating of a treated substrate is a value indicative of the dynamic repellency of the treated substrate to water that impinges on the treated substrate. The repellency was measured by Test Method 22-1996, published in the 2001 Technical Manual of the American Association of Textile Chemists and Colorists (AATCC), and is expressed in terms of a 'spray rating' of the tested substrate. The spray rating was obtained by spraying 250 milliliters (mL) water on the substrate from a height of 15 centimeters (cm). The wetting pattern was visually rated using a 0 to 100 scale, where 0 means complete wetting and 100 means no wetting at all. Spray rating was measured initially and after the fabric was laundered 5, 10, or 20 times (designated as 5 L, 10 L, or 20 L respectively).

The laundering procedure consisted of placing a 400-900 cm² sheet of treated substrate in a washing machine (Miele Novotronic T490) along with ballast sample (1.9 kilograms (kg) of 8-ounce fabric). A commercial detergent ("Sapton" available from Henkel, Germany, 46 grams (g)) was added. The substrate and ballast load were washed using a short wash cycle at 40° C., followed by a rinse cycle and centrifuging. The sample was not dried between repeat cycles. After the required number of cycles the textile samples were dried in a Miele T-356 tumble drier, setting 'extra dry', and conditioned overnight at room temperature before drying.

For the examples and comparatives done with added wax the laundering procedure was slightly modified as follows: A Kenmore Elite washing machine was used, 38 g "TIDE" (Proctor & Gamble) laundry detergent was used, the tumble drier was set to "high," and the samples were NOT conditioned overnight before drying as above.

In certain test methods, drying may or may not be done between launderings.

Treatment Procedure Via "Padding" Process

The treatments were applied onto the textile substrates, by immersing the substrates in the treatment dispersion and agitating until the substrate was saturated. The saturated substrate was then run through a padder/roller to remove excess of the dispersion and to obtain a certain % Wet Pick Up (WPU) (100% WPU means that after this process the substrate absorbed 100% of its own weight of the treatment dispersion before drying). Drying was done as indicated in the examples.

EXAMPLES

Preparation of Acrylate Oligomers $(ODA)_{12}$ and $(ODA)_{15}$

In a 1-liter round-bottomed 3-necked reaction flask, 324 g (1 mole) of octadecyl acrylate monomer (ODA) was mixed with 6.5 g (1/12 mole) of 2-mercaptoethanol, 110 g ethylacetate, and 0.8 g V-59 initiator. The mixture was heated to reflux temperature, and a clearly visible exotherm was observed, the reaction was continued for 2 hours (hrs) at reflux temperature. Then, again 0.8 g of V-59 was added and the reaction continued at reflux temperature overnight. When cooled to room temperature a solid white waxy material was obtained at 75% solids in ethylacetate with a theoretical MW of 3966. $(ODA)_{12}$ is a hydroxy-endcapped oligomer containing in average 12 repeating units of octadecylacrylate ($Y^1$—$(ODA)_{12}$-S—$CH_2CH_2$—OH, wherein $Y^1$ is the residue of the V-59 initiator).

The same general procedure was also used to prepare the oligomer $(ODA)_{15}$ but using, 5.2 g (1/15 mole) of 2-mercaptoethanol instead of 6.5 g (1/12 mole) of 2-mercaptoethanol. $(ODA)_{15}$ is a hydroxy-endcapped oligomer containing in average 15 repeating units of octadecylacrylate ($Y^1$-$(ODA)_{15}$-S—$CH_2CH_2$—OH, wherein $Y^1$ is the residue of the V-59 initiator).

Preparation of Acrylate Monomer (SI-HOEA) and Oligomer $(SI-HOEA)_{12}$

In a 1-liter round-bottomed 3-necked reaction flask, 295.5 g of stearyl isocyanate (1 mole) was mixed with 116 g of 2-hydroxyethyl acrylate (1 mole). At room temperature a clear solution was obtained. The reaction quickly started after the addition of 5 drops of DBTDL, the temperature of the reaction mixture spontaneously increased, and a white insoluble material started to form in the mixture. Temperature was raised to 80° C. and the reaction was continued for 3 hours at 80° C. After this period the FTIR spectrum showed all NCO disappeared. The structure of the final material (hard solid waxy material) was confirmed by NMR to be $C_{18}H_{37}NHC(O)OCH_2CH_2OC(O)CH=CH_2$ (SI-HOEA). In a similar procedure to that of $(ODA)_{12}$ the SI-HOEA monomer was oligomerized to $(SI-HOEA)_{12}$.

Preparation of Polycarbodiimides (PCD) with Long-Chain Hydrocarbon Group

Example 1

Preparation of $ODA_{12}$-$(MDI-PCD)_5$-$ODA_{12}$

In a 500-mL round-bottomed 3-necked reaction flask, 71.9 g $(ODA)_{12}$ oligomer solution as prepared above, 8.5 g MDI (MW 250), 69.6 g ethylacetate, and 0.05 g MPPO (PCD catalyst) were mixed and reacted overnight at reflux temperature. An FTIR spectrum showed all NCO disappeared and reacted into urethane and polycarbodiimide (PCD). This resulted in a 40% solids polycarbodiimide solution.

A 150-gram solution of the polycarbodiimide prepared above was then dispersed in water by mixing it at 60° C. with a water phase, consisting of 154 g deionized (DI) water, 1.6 g Ethoquad C-12, 3.6 g Tergitol TMN-6, and 1.8 g Tergitol 15-S-30. This premix was then ultrasonically treated with a 'Branson Sonifier' for 6 minutes at maximum setting. Then the ethylacetate was removed by vacuum distillation to result in a stable solvent-free dispersion, which was diluted to 30% solids with DI-water. This material is referred to as $ODA_{12}$-$(MDI$-$PCD)_5$-$ODA_{12}$, which is a polycarbodiimide that has the following structure:

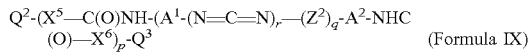 (Formula IX)

wherein:
$X^5$ and $X^6$ are each O;
$A^1$ and $A^2$ each represents the residue of an organic di-isocyanate compound (MDI);
q is 0;
p is 1;
r is 5; and
$Q^2$ and $Q^3$ each represent $-(CH_2)_a$-S-U (Formula XI), wherein a=2 and U is an oligomer of 12 acrylate monomers having an alkyl group of 18 carbon atoms.

Example 2

Preparation of $(SI$-$HOEA)_{12}$-$(MDI$-$PCD)_5$-$(SI$-$HOEA)_{12}$

In a 500-mL round-bottomed 3-necked reaction flask, 71.1 g $(SI$-$HOEA)_{12}$ oligomer solution as prepared above, 6.7 g MDI (MW 250), 72.2 g ethylacetate, and 0.05 g MPPO (PCD catalyst) were mixed and reacted overnight at reflux temperature. An FTIR spectrum showed all NCO disappeared and reacted into urethane and polycarbodiimide (PCD). This resulted in a 40% solids polycarbodiimide solution.

A 150-gram solution of the polycarbodiimide prepared above was then emulsified exactly as in Example 1 to result in a 30% solids in DI-water. This material is referred to as $(SI$-$HOEA)_{12}$-$(MDI$-$PCD)_5$-$(SI$-$HOEA)_{12}$, which is a polycarbodiimide that has the following structure:

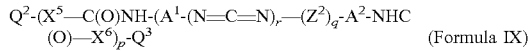 (Formula IX)

wherein:
$X^5$ and $X^6$ are each O;
$A^1$ and $A^2$ each represents the residue of an organic di-isocyanate compound (MDI);
q is 0;
p is 1;
r is 5; and
$Q^2$ and $Q^3$ each represent $-(CH_2)_a$-S-U (Formula XI), wherein a=2 and U is an oligomer of 12 acrylate monomers. The acrylate monomers are represented by $R^3$-$NHC(O)O$-$L^1$-$OC(O)C(R^2)$=$CH_2$ (Formula II), wherein $R^3$ is a hydrocarbon group having 18 carbon atoms, $L^1$ is an alkylene group with 2 carbon atoms, and $R^2$ is H.

Example 3

Preparation of $(SI$-$HOEA)_{12}$-$(MDI$-$PCD)_{10}$-$(SI$-$HOEA)_{12}$

In a 500-mL round-bottomed 3-necked reaction flask, 64 g $(SI$-$HOEA)_{12}$ oligomer solution as prepared above, 12 g MDI (MW 250), 74 g ethylacetate, and 0.05 g MPPO (PCD catalyst) were mixed and reacted overnight at reflux temperature. An FTIR spectrum showed all NCO disappeared and reacted into urethane and polycarbodiimide (PCD). This resulted in a 40% solids polycarbodiimide solution.

A 150-gram solution of the polycarbodiimide prepared above was then emulsified exactly as in Example 1 to result in a 30% solids in DI-water. The material is referred to as $(SI$-$HOEA)_{12}$-$(MDI$-$PCD)_{10}$-$(SI$-$HOEA)_{12}$, which is a polycarbodiimide that has the following structure:

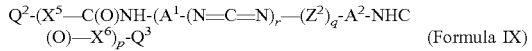 (Formula IX)

wherein:
$X^5$ and $X^6$ are each O;
$A^1$ and $A^2$ each represents the residue of an organic di-isocyanate compound (MDI);
q is 0;
p is 1;
r is 10; and
$Q^2$ and $Q^3$ each represent $-(CH_2)_a$-S-U (Formula XI), wherein a=2 and U is an oligomer of 12 acrylate monomers. The acrylate monomers are represented by $R^3$-$NHC(O)O$-$L^1$-$OC(O)C(R^2)$=$CH_2$ (Formula II), wherein $R^3$ is a hydrocarbon group having 18 carbon atoms, $L^1$ is an alkylene group with 2 carbon atoms, and $R^2$ is H.

Example 4

Preparation of $ODA_{15}$/SA/PAPI/PCD (0.1/0.2/1/0.7)

In a 500-mL round-bottomed 3-necked reaction flask, 60.4 g $(ODA)_{15}$ oligomer solution as prepared above, 4.8 g SA, 11.9 g PAPI, 72.9 g ethylacetate, and 0.05 g MPPO (PCD catalyst) were mixed and reacted overnight at reflux temperature. An FTIR spectrum showed all NCO disappeared and reacted into urethane and polycarbodiimide (PCD). This resulted in a 40% solids polycarbodiimide solution.

A 150-gram solution of the polycarbodiimide prepared above was then emulsified exactly as in Example 1 to result in a 30% solids in DI-water. The material is referred to as $ODA_{15}$/SA/PAPI/PCD (0.1/0.2/1/0.7). This polycarbodiimide compound is derived from a carbodiimidization reaction of a reaction mixture including an oligomer comprising at least one isocyanate group, PAPI, and SA. The isocyanate-containing oligomer is the reaction product of PAPI and an oligomeric alcohol $((ODA)_{15})$, the latter of which is prepared by reaction of mercaptoethanol with on average 15 repeating units of a (meth)acrylate monomer having the following formula: $R^1$-$OC(O)C(R^2)$=$CH_2$ (Formula I), wherein $R^1$ is a hydrocarbon group of 18 carbons, and $R^2$ is H.

Example 5

Polycarbodiimide prepared as per U.S. Pat. No. 8,440,779 as "PCD-5" by reacting $(ODA)_4$ oligomer and isostearyl alcohol followed by carbodiimidization and emulsification. The PCD has the following structure:

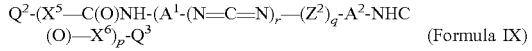 (Formula IX)

wherein:
$X^5$ and $X^6$ are each O;
$A^1$ and $A^2$ each represents the residue of an organic di-isocyanate compound (MDI);
q is 0;
p is 1;
r is 3;
$Q^2$ is represented by represent $-(CH_2)_a$-S-U (Formula XI), wherein a=2 and U is an oligomer of 4 acrylate monomers having an alkyl group of 18 carbon atoms; and

33

$Q^3$ is a hydrocarbon group with 18 carbon atoms, more specifically an isostearyl alcohol residue.

Example 6

Preparation of MDI/(AOI-SA)$_{12}$ (4:1)

In a 250-mL 3-necked flask, fitted with a stirrer, heating mantle, cooler and thermometer, were placed 54 g (0.2 mol) SA, 28.2 g AOI (0.2 mol), 35 g ethylacetate, and 1 drop of DBTDL. The reaction mixture was reacted for 5 hours at 85° C. under nitrogen atmosphere. An IR check showed that all isocyanate had reacted.

This monomer is an example of Formula III, $R^4—X^1—C(O)NH-L^2-OC(O)C(R^2)=CH_2$, wherein $R^4$ is stearyl, $X^1=O$, $L^2$=ethyl, and $R^2$=H.

The mixture was cooled to 60° C., and 1.3 g 2-mercaptoethanol (0.017 mol) and 0.2 g VAZO-67 were added. The mixture was degassed 3 times using aspirator vacuum and nitrogen and then heated up to about 70° C. A vigorous exotherm took off up to 88° C. The reaction was continued for 3 hours at 85° C. under nitrogen. Then, 0.05 g VAZO-67 was added and the reaction continued for 16 hours. A clear solution of the hydroxyl-functionalized oligomer was obtained. The reaction mixture was diluted by using 20 g ethylacetate and cooled to 30° C. under nitrogen. Then, 17 g MDI (0.068 mol) and 0.1 g MPPO catalyst were added. The mixture was heated up to 90° C. for 16 hours and a slightly hazy solution resulted. An IR analysis indicated that all isocyanate groups were reacted and that carbodiimide groups were formed. The PCD has the following structure:

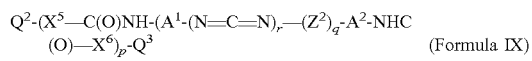

(Formula IX)

wherein:

$X^5$ and $X^6$ are each O;

$A^1$ and $A^2$ each represents the residue of an organic di-isocyanate compound (MDI);

q is 0;

p is 1;

r is 7;

$Q^2$ and $Q^3$ each represent $—(CH_2)_a—S—U$ (Formula XI), wherein a=2 and U is an oligomer of 12 acrylate monomers. The acrylate monomers are represented by $R^4—X^1—C(O)NH-L^2-OC(O)C(R^2)=CH_2$ (Formula III), wherein $R^4$ is a hydrocarbon group having 18 carbon atoms, $L^2$ is an alkylene group with 2 carbon atoms, and $R^2$ is H.

The reaction mixture above was then emulsified as follows: 200 g of the 50% solids reaction mixture in ethylacetate was added to a 1000 mL three-necked flask, fitted with a stirrer, heating mantle, thermometer, and cooler. The mixture was heated up to 70° C. and mixed until a clear solution was obtained. In a 1000-mL beaker were placed 3 g Tergitol 15-S-30, 6 g Tergitol TMN-6, and 3.7 g Armocare VGH-70, and 400 g DI-water. This mixture was also warmed up to about 70° C. and then added under vigorous stirring to the above organic solution in the 1000-mL three-necked flask. A pre-emulsion was obtained at 70° C. This pre-emulsion was passed 3 times through a pre-heated 2-step Manton-Gaulin homogenizer at 300 bar pressure. Solvent was stripped off at a temperature of about 45° C. to 50° C. and vacuum of about 20-30 mm Hg. A stable dispersion at about 20% solids in water resulted. Particle size was 120-180 nm.

34

Example 7

Preparation of MDI/(Unilin 350 Acrylate)$_{10}$ (4:1)

Synthesis of Unilin 350 Acrylate: In a 1000-mL three-necked flask fitted with a stirrer, heating mantle, Dean Stark trap, cooler, and thermometer were placed 434 g (1 mol) Unilin 350 alcohol, 72 g (1 mol) acrylic acid, 200 g toluene, 0.02 g MEHQ, and 2.5 g methanesulfonic acid. The reaction mixture was heated to reflux and water was continuously captured in the trap. After 8 hours reaction, 17.5 g water was collected. The mixture was cooled to 90° C. and a solution of 1.6 g Na$_2$CO$_3$ in 10 g water was added dropwise over 15 minutes. A vigorous neutralization reaction took place. The reaction mixture was washed 3 times using 200 g water at 80° C. The organic layer was collected and the toluene stripped off under reduced pressure of 40 mm Hg. This monomer is a compound of Formula I, $R^1—OC(O)C(R^2)=CH_2$, wherein $R^1$ is a Unilin (C24-C28) residue.

Synthesis of (Unilin 350 Acrylate)$_{10}$ oligomeric alcohol: In a 250-mL three-necked flask fitted with a stirrer, cooler, thermometer, and heating mantle were placed 97.6 g (0.2 mol) of above prepared "Unilin 350 Acrylate," 1.6 g (0.02 mol) 2-mercaptoethanol, 50 g toluene, and 0.15 g VAZO-67 initiator. The mixture was degassed 3 times using vacuum and nitrogen pressure and then heated to 75° C. under nitrogen. The mixture exothermed to about 102° C. and the reaction was continued for about 3 hours at 85° C. Then, 0.05 g VAZO-67 was added and the reaction was continued for 16 hours at 85° C. A clear solution of the functionalized oligomer in toluene was obtained.

Synthesis of MDI/(Unilin 350 Acrylate)$_{10}$ (4:1): In a 500-mL three-necked flask fitted with a stirrer, cooler, thermometer, and heating mantle was placed the toluene solution of the "(Unilin 350 Acrylate)$_{10}$ oligomeric alcohol," prepared above. All toluene was stripped off using aspirator vacuum at 80° C. Then, 80 g MIBK, 20 g (0.08 mol) MDI, and 0.1 g MPPO catalyst were added. The mixture was heated up to 90° C. under nitrogen for 16 hours and a slightly hazy solution was obtained. An IR analysis indicated that all isocyanate groups were reacted and that carbodiimide groups were formed.

A 200-gram sample of a 50% solids solution, prepared above, was placed in a 1000-mL three-necked flask, fitted with a stirrer, heating mantle, thermometer, and cooler. The mixture was heated to 80° C. and mixed until a clear solution was obtained. In a 1000-mL beaker were placed 3 g Tergitol 15-S-30, 6 g Tergitol TMN-6, 3.7 g Armocare VGH-70, and 400 g DI-water. This mixture was also warmed up to about 80° C. and then added under vigorous stirring to the above-mentioned organic solution in the 1000-mL three-necked flask. A pre-emulsion was obtained at about 80° C. This pre-emulsion was passed 3 times through a pre-heated 2-step Manton-Gaulin homogenizer at 300 bar pressure and 80° C. Solvent was stripped off at a temperature of 50° C. and vacuum of 20-30 mm Hg. A stable dispersion at about 20% solids in water resulted. Particle size was 120-180 nm. The polycarbodiimide (i.e., PCD) has the following structure:

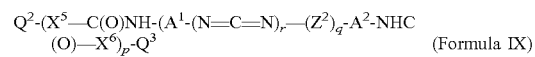

(Formula IX)

wherein:

$X^5$ and $X^6$ are each O;

$A^1$ and $A^2$ each represents the residue of an organic di-isocyanate compound (MDI);

q is 0;
p is 1;
r is 7; and
$Q^2$ and $Q^3$ each represent —$(CH_2)_a$—S—U (Formula XI), wherein a=2 and U is an oligomer of 10 acrylate monomers having an alkyl group of about 30 carbon atoms.

Example 8

Preparation of MDI/(AOI-Unilin 350)$_{10}$ (4:1)

Synthesis of AOI-Unilin 350 Acrylate: In a 250-mL three-necked flask, fitted with a stirrer, cooler, thermometer, and heating mantle were placed 86.8 g (0.2 mol) Unilin 350 alcohol, 28.2 g (0.2 mol) AOI, 40 g ethylacetate, and 1 drop of DBTDL catalyst. The reaction was heated up to 80° C. for 5 hours under a nitrogen atmosphere. An IR analysis indicated that all isocyanate groups had reacted. A clear solution at 80° C. was obtained.

This monomer is an example of Formula III, $R^4$—$X^1$—$C(O)NH$-$L^2$-$OC(O)C(R^2)$=$CH_2$, wherein $R^4$ is a Unilin (C24-C28) residue, $X^1$=O, $L^2$=ethyl, and $R^2$=H.

Synthesis of (AOI-Unilin 350)$_{10}$ oligomeric alcohol: In a 500-mL three-necked flask fitted with a stirrer, cooler, thermometer, and heating mantle were placed 115 g (0.2 mol) of above prepared "AOI-Unilin 350 Acrylate," 1.6 g (0.02 mol) 2-mercaptoethanol, 50 g ethylacetate, and 0.2 g VAZO-67 initiator. The mixture was degassed 3 times using vacuum and nitrogen pressure and then heated to 75° C. under nitrogen. The mixture exothermed to about 96° C. and the reaction was continued for about 3 hours at 85° C. Then, 0.05 g VAZO-67 was added and the reaction was continued for 16 hours at 85° C. A clear solution of the functionalized oligomer in ethylacetate was obtained.

Synthesis of MDI/(AOI-Unilin 350)$_{10}$ (4:1): In a 500-mL three-necked flask fitted with a stirrer, cooler, thermometer, and heating mantle was placed the ethylacetate solution of the "AOI-Unilin 350-10 oligomeric alcohol," prepared above. All ethylacetate was stripped off using aspirator vacuum at 80° C. Then, 80 g MIBK, 20 g (0.08 mol) MDI, and 0.1 g MPPO catalyst were added. The mixture was heated up to 90° C. under nitrogen for 16 hours and a slightly hazy solution was obtained. An IR analysis indicated that all isocyanate groups were reacted and that carbodiimide groups were formed.

A 200-gram sample of a 50% solids solution, prepared above, was placed in a 1000-mL three-necked flask, fitted with a stirrer, heating mantle, thermometer, and cooler. The mixture was heated to 80° C. and mixed until a clear solution was obtained. In a 1000-mL beaker were placed 3 g Tergitol 15-S-30, 6 g Tergitol TMN-6, 3.7 g Armocare VGH-70, and 400 g DI-water. This mixture was also warmed up to about 80° C. and then added under vigorous stirring to the above-mentioned organic solution in the 1000-mL three-necked flask. A pre-emulsion was obtained at about 80° C. This pre-emulsion was passed 3 times through a pre-heated 2-step Manton-Gaulin homogenizer at 300 bar pressure and 80° C. Solvent was stripped off at a temperature of 50° C. and vacuum of 20-30 mm Hg. A stable dispersion at about 20% solids in water resulted. The polycarbodiimide (PCD) has the following structure:

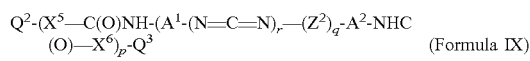
(Formula IX)

wherein:
$X^5$ and $X^6$ are each O;
$A^1$ and $A^2$ each represents the residue of an organic di-isocyanate compound (MDI);
q is 0;
p is 1;
r is 7; and
$Q^2$ and $Q^3$ each represent —$(CH_2)_a$—S—U (Formula XI), wherein a=2 and U is an oligomer of 10 acrylate monomers. The acrylate monomers are represented by $R^4$—$X^1$—$C(O)NH$-$L^2$-$OC(O)C(R^2)$=$CH_2$ (Formula III), wherein $R^4$ is a hydrocarbon group having about 30 carbon atoms, $L^2$ is an alkylene group with 2 carbon atoms, and $R^2$ is H.

Comparative Example A

Polycarbodiimide prepared as per U.S. Pat. No. 8,440,779 as "PCD-2" by reacting (iBMA)$_8$ oligomer and isostearyl alcohol followed by carbodiimidization and emulsification. iBMA is isobutylmethacrylate which is a short chain hydrocarbon acrylate.

Comparative Example B (CE B)

This is a fluorochemical repellent prepared as per International Publication WO2013/162704 Example 1.

Comparative Examples C-E

Comparative Examples C and D (CE C and CE D) are commercial fluorine-free products for high durability water repellent finishes available under the trade designations "PHOBOL RSH" and "PHOBOTEX RHW" respectively from Huntsman Textile Effects, Singapore. "PHOBOL RSH" was analyzed by 1H-NMR and 13C-NMR and found to not contain carbodiimide functionality but to contain mostly wax-type material (about 75%) $CH_3$—$(CH_2)_n$—$CH_3$, where average n=approximately 25, and smaller amounts of silicone, polystyrene, and carboximide functionality.

Comparative Example E (CE E) is a commercial fluorine-free product for high durability water repellent finishes available under the trade designations "FREEPEL 1225" from Emerald Performance Materials, Cuyahoga Falls, Ohio.

Spray Rating Testing of Polycarbodiimide Examples 1-8 and Comparatives A-E

Applications of the dispersions to the fabric in Table 1 were done as per "Treatment Procedure via "Padding" Process." Before application to the textile the polymer dispersions were diluted with DI-water to 0.6% solids. For the WPU see Table 1. After application the fabrics were dried and cured at 150° C. for 2 minutes and conditioned overnight at room temperature before testing. Spray value ratings were determined as per the "Spray Ratings (SR)" test method.

TABLE 1

| | Spray Ratings of Polycarbodiimides | | | | | |
|---|---|---|---|---|---|---|
| Example | PES Microfiber (100% WPU) Initial | PA Microfiber (93% WPU) Initial | PES 10LD | PA 10LD | PES 20LD | PA 20LD |
| 1 | 95 | 100 | 90 | 100 | 90 | 100 |
| 2 | 100 | 100 | 100 | 100 | 100 | 100 |

TABLE 1-continued

Spray Ratings of Polycarbodiimides

| Example | PES Microfiber (100% WPU) Initial | PA Microfiber (93% WPU) Initial | PES 10LD | PA 10LD | PES 20LD | PA 20LD |
|---|---|---|---|---|---|---|
| 3 | 100 | 100 | 90 | 100 | 90 | 100 |
| 4 | 100 | 100 | 95 | 100 | 90 | 100 |
| 5 | 80 | 90 | NT | NT | NT | NT |
| 6 | 100 | 100 | 80 | 90 | 80 | 80 |
| 7 | 80 | 90 | 80 | 90 | 80 | 90 |
| 8 | 100 | 100 | 90 | 80 | 90 | 80 |
| CE A | 50 | 70 | NT | NT | NT | NT |
| CE B | 100 | 100 | 80 | 50 | 80 | 50 |
| CE C | 100 | 100 | 70 | 0 | 0 | 0 |
| CE D | 100 | 100 | 0 | 0 | 0 | 0 |
| CE E | 100 | 100 | 50 | 0 | 0 | 0 |

NT = not tested; "XLD" means X laundering and drying cycles

Blends of Polycarbodiimides and Waxes

Treatment baths were prepared containing a defined amount of the wax/polycarbodiimide blends. Treatments were applied to the test substrates by padding (see "Treatment Procedure via "Padding" Process") to provide a concentration as indicated in the examples (based on fabric weight and indicated as SOF (solids on fabric)). Samples were dried and cured (150-170° C. for 1-5 minutes). After drying and heat cure, the substrates were tested for their repellency properties as per "Spray Rating (SR)."

COMPARATIVE EXAMPLES

Comparative Example F (CE F) was paraffin1 wax ONLY (1 and 0.5% SOF) with spray rating results shown in Table 2. CE C was a commercial fluorine-free product for high durability water repellent finishes available under the trade designation "PHOBOL RSH" from Huntsman Textile Effects, Singapore.

Examples 9 and 9A

Blends of PCD and Paraffin1 Wax

Paraffin1 wax (268.8 g) was dissolved in 403.2 g ethyl-acetate at 65° C. (solution A) in a 2-L three-neck round-bottomed flask. A sample of 10.75 g Armorcare VGH-70, 13.44 g Brij S2, and 13.44 g of Brij S20 were dissolved in 731.2 g DI-water (solution B) in a 1-L glass beaker at 65° C. Solutions A and B were mixed and stirred for 15 minutes (min) at 65° C. The mixture of solutions A and B was then homogenized by passing through a homogenizer (Microfluidics Corp., HC8000) at 65° C. twice. Ethylacetate was removed by vacuum distillation at 40° C. Propylene glycol (74.25 g) was then added as a freeze protector. Solid content of the obtained wax emulsion was 25%.

To produce a 7:3 SOF ratio of paraffin to PCD, 82.4 g of Example 5 PCD emulsion was added to 200 g of the paraffin1 wax emulsion above at room temperature to produce a blended emulsion with a solid content of 25.2%. To obtain the % SOF indicated in Table 3 a fraction of this mixture was then added to 150 mL of DI-water and used for fabric immersion and treatment per the "Treatment Procedure via "Padding" Process." Other ratios were tested by varying the mass ratios of wax and PCD as indicated in Table 2 as EX9.

An alternative non-premix process was also used (EX9A). For a SOF ratio of 7:3 paraffin to PCD, 5.98 g paraffin1 wax emulsion, and 2.49 g Example 5 PCD (EX5 PCD) emulsion were NOT first premixed but were each added separately into 150 g water and then mixed well before fabric immersion and treatment per the "Treatment Procedure via "Padding" Process." Other ratios were tested by varying the mass ratios of wax and PCD as indicated in Table 2. As seen in Table 2 this alternative mix process gave slightly different results (EX9 vs EX9A).

TABLE 2

Spray Ratings Polycarbodiimide Blend with Paraffin1 Wax

| Example | % SOF | PPP (73% WPU) Initial | NTD (66% WPU) Initial | PPP 5LD | NTD 5LD | PPP 20LD | NTD 20LD |
|---|---|---|---|---|---|---|---|
| CE F Paraffin1 only | 1 (0.5) | 0 (0) | 50 (50) | 0 (0) | 0 (0) | 0 (0) | 0 (0) |
| Example 5 PCD only | 1 | 85 | 100 | 85 | 90 | 80 | 75 |
| CE C | 1 (0.5) | 100 (90) | 100 (100) | 80 (50) | 70 (60) | 60 (50) | 60 (50) |
| EX9 3:7 Paraffin1:PCD | 1 (0.5) | 80 (80) | 90 (80) | 80 (80) | 85 (80) | 80 (75) | 75 (50) |
| EX9 4:6 Paraffin1:PCD | 1 (0.5) | 100 (80) | 100 (80) | 90 (80) | 85 (70) | 80 (75) | 70 (50) |
| EX9 5:5 Paraffin1:PCD | 1 (0.5) | 100 (80) | 100 (80) | 100 (80) | 90 (75) | 80 (75) | 75 (50) |
| EX9 7:3 Paraffin1:PCD | 1 (0.5) | 85 (80) | 90 (80) | 85 (70) | 80 (50) | 80 (70) | 50 (50) |
| EX9A 7:3 Paraffin1:PCD | 1 | 100 | 100 | 100 | 90 | 80 | 50 |
| EX9A 6:4 Paraffin1:PCD | 1 | 85 | 85 | 80 | 70 | 80 | 50 |

TABLE 2-continued

Spray Ratings Polycarbodiimide Blend with Paraffin1 Wax

| Example | % SOF | PPP (73% WPU) Initial | NTD (66% WPU) Initial | PPP 5LD | NTD 5LD | PPP 20LD | NTD 20LD |
|---|---|---|---|---|---|---|---|
| EX9A 5:5 Paraffin1:PCD | 1 | 85 | 90 | 80 | 80 | 80 | 60 |
| EX9A 4:6 Paraffin1:PCD | 1 | 85 | 90 | 85 | 85 | 80 | 70 |

Examples 10 and 10A

Blends of PCD and Paraffin2 Wax

Example 5 PCD emulsion (34.88 g) was added to 42 g of paraffin2 emulsion at room temperature to produce a blended emulsion with a solid content of 39%. The mass ratio of paraffin to PCD was 7:3. To obtain the 1% SOF indicated in Table 3 a fraction of this mixture was then added to 150 mL of DI-water and used for fabric immersion and treatment per the "Treatment Procedure via "Padding" Process" (EX10).

An alternative non-premix process was also used (EX10A). For a SOF ratio of 7:3 paraffin to PCD, 2.88 g paraffin2 wax emulsion, and 2.47 g Example 5 PCD emulsion were NOT first premixed but were each added separately into 150 g water and then mixed well before fabric immersion and treatment per the "Treatment Procedure via "Padding" Process." A 6:4 ratio was also tested by varying the mass ratios of wax and PCD as indicated in Table 3. As seen in Table 3 this alternative mix process gave slightly different results (EX10 vs EX10A).

TABLE 3

Spray Ratings Polycarbodiimide Blend with Paraffin2 Wax

| Example | % SOF | PPP (73% WPU) Initial | NTD (66% WPU) Initial | PPP 5LD | NTD 5LD | PPP 20LD | NTD 20LD |
|---|---|---|---|---|---|---|---|
| CEG Paraffin2 only | 1 | 90 | 80 | 50 | 50 | 50 | 0 |
| Example 5 PCD only | 1 | 85 | 100 | 85 | 90 | 80 | 75 |
| EX10 7:3 Paraffin2:PCD | 1 | 80 | 90 | 80 | 75 | 75 | 50 |
| EX10A 7:3 Paraffin2:PCD | 1 | 100 | 100 | 90 | 80 | 80 | 60 |
| EX10A 6:4 Paraffin2:PCD | 1 | 90 | 100 | 85 | 85 | 75 | 60 |

Example 11

Blend of PCD and Paraffin Wax (Solvent Coemulsion)

Paraffin1 wax (40 g) was dissolved in 60 g MIBK at 70° C. A sample of 42.86 g PCD (made as in U.S. Pat. No. 8,440,779 "PCD 5" but left unemulsified in MIBK (40% solid)) was added and mixed at 70° C. Brij S2 (2.86 g), 2.86 g Brij S20, 2.29 g Armorcare VGH-70, and 171.42 g water was added and mixed well at 70° C. The mixture was homogenized twice at 70° C. and the solvent was evaporated under vacuum at 40° C. Propylene glycol (17.2 g) was added into the obtained emulsion as freeze protector. The final emulsion had a solids content of 23%. The application to fabrics was the same as in Example 9.

TABLE 4

Spray Ratings PCD Blend with Paraffin Waxes (Solvent Coemulsions)

| Example | % SOF | PPP (70% WPU) Initial | NTD (66% WPU) Initial | PPP 5LD | NTD 5LD | PPP 20LD | NTD 20LD |
|---|---|---|---|---|---|---|---|
| CE F Paraffin1 wax only | 1 | 50 | 50 | 0 | 0 | 0 | 0 |
| Example 5 PCD only | 1 | 85 | 100 | 85 | 90 | 80 | 75 |
| EX11 7:3 Paraffin1:PCD | 1 | 100 | 90 | 90 | 70 | 70 | 50 |

Example 12

Non-Oligomer ("Dialcohol") PCD Blend with Paraffin Wax

This example is a blend of paraffin1 wax and the PCD from U.S. Pat. No. 5,817,249 identified therein as "HCD-1" which was made from "Prisorene 3515" (methyl branched isostearyl alcohol commercially available from Unichema Chemie, Gouda, The Netherlands) and MDI. The only change was that the emulsifier package was that of Example 1 of the current application.

TABLE 5

Spray Ratings Non oligomer PCD Blend with Paraffin Wax

| Example | % SOF | PPP (70% WPU) Initial 140° C. | NTD (66% WPU) Initial 140° C. | PPP 5LD 140° C. | NTD 5LD 140° C. | PPP 20LD 140° C. | NTD 20LD 140° C. |
|---|---|---|---|---|---|---|---|
| CE F Paraffin1 only | 1 | 0 | 50 | 0 | 0 | 0 | 0 |

TABLE 5-continued

Spray Ratings Non oligomer PCD Blend with Paraffin Wax

| Example | % SOF | PPP (70% WPU) Initial 140° C. | NTD (66% WPU) Initial 140° C. | PPP 5LD 140° C. | NTD 5LD 140° C. | PPP 20LD 140° C. | NTD 20LD 140° C. |
|---|---|---|---|---|---|---|---|
| PCD only HCD-1 | 1 | 70 | 75 | 60 | 50 | 50 | 50 |
| EX12 7:3 Paraffin1: HCD-1 | 1 | 90 | 90 | 70 | 50 | 50 | 0 |
| EX12 5:5 Paraffin1: HCD-1 | 1 | 90 | 90 | 70 | 50 | 50 | 50 |

Comparative Examples

PCD Blended with Non-Paraffin Waxes

Montan wax (30 g) was dissolved in 45 g ethylacetate at 75° C. (solution A) in a 2-L three-neck round-bottomed flask. Tergitol TMN-6 (1.8 g) and 1.5 g Tergitol 15-S-30 were dissolved in 120 g DI-water (solution B) in a 1-L glass beaker at 65° C. Solutions A and B were mixed and stirred for 15 minutes (min) at 65° C. The mixture of solutions A and B was then ultrasonicated with a 'Branson Sonifier 450' for 4 min at 90% duty cycle. Ethylacetate was removed by vacuum distillation at 40° C. Solids content of the obtained emulsion was 22%.

EX5 PCD emulsion (11.21 g) was added at room temperature to 30.91 g of the montan wax emulsion made above to produce a blended emulsion with a solids content of 23%. To obtain the 1% SOF indicated in Table 3 a fraction of this mixture was then added to 150 mL of DI-water and used for fabric immersion and treatment per the "Treatment Procedure via "Padding" Process" (CE I).

PE wax emulsion (2.39 g) and 2.49 g EX5 PCD emulsion were NOT first premixed but were each added separately into 150 g water and then mixed well before fabric immersion and treatment per the "Treatment Procedure via "Padding" Process" (CE K).

Carnauba wax emulsion (3.70 g) and 2.49 g EX5 PCD emulsion were NOT first premixed but were each added separately into 150 g water and then mixed well before fabric immersion and treatment per the "Treatment Procedure via "Padding" Process" (CE M).

Bees wax (26.88 g) was dissolved in 40.32 g ethylacetate at 65° C. (solution A) in a 1 L three-neck round-bottomed flask. Ethoquad C-12 (0.72 g), 1.61 gram Tergitol TMN-6, and 0.81 g Tergitol 15-S-30 were dissolved in 73.12 g DI-water (solution B) in a 1-L glass beaker at 65° C. Solutions A and B were mixed and stirred for 15 min at 65° C. The mixture of solutions A and B was then homogenized by passing through a homogenizer (Microfluidics Corp., HC8000) at 65° C. twice. Ethylacetate was removed by vacuum distillation at 40° C. Propylene glycol (7.53 g) was then added as freeze protector. Solids content of the obtained emulsion was 26.4%. EX5 PCD emulsion (4.39 g) was added to 10 g of the beeswax emulsion made above at room temperature to produce a blended emulsion with a solids content of 26.2%. The mass ratio of beeswax and EX5 PCD solid was 7:3. To obtain the 1% SOF indicated in Table 6 a fraction of this mixture was then added to 150 mL of DI-water and used for fabric immersion and treatment per the "Treatment Procedure via "Padding" Process" (CE O).

Spray results for all non paraffin waxes in Table 6. All blends with PCD used Example 5 PCD.

TABLE 6

Spray Ratings PCD blended with non-paraffin waxes

| Example | % SOF | PPP (73% WPU) Initial | NTD (66% WPU) Initial | PPP 5LD | NTD 5LD | PPP 20LD | NTD 20LD |
|---|---|---|---|---|---|---|---|
| Example 5 PCD only | 1 | 85 | 100 | 85 | 90 | 80 | 75 |
| CE H Montan wax only | 1 | 0 | 0 | 0 | 0 | 0 | 0 |
| CE I 7:3 Montan: PCD | 1 | 70 | 70 | 50 | 50 | 0 | 0 |
| CE J PE wax only | 1 | 0 | 0 | 0 | 0 | 0 | 0 |
| CE K 7:3 PE wax: PCD | 1 | 70 | 75 | 60 | 60 | 50 | 50 |
| CE L carnauba wax only | 1 | 0 | 0 | 0 | 0 | 0 | 0 |
| CE M 7:3 carnauba wax: PCD | 1 | 80 | 85 | 80 | 85 | 70 | 50 |
| CE N Bees wax only | 1 | 0 | 50 | 0 | 0 | 0 | 0 |
| CE O 5:5 Bees Wax: PCD | 1 | 80 | 75 | 75 | 60 | 70 | 50 |

The complete disclosures of the patents, patent documents, and publications cited herein are incorporated by reference in their entirety as if each were individually incorporated. Various modifications and alterations to this disclosure will become apparent to those skilled in the art without departing from the scope and spirit of this disclosure. It should be understood that this disclosure is not intended to be unduly limited by the illustrative embodiments and examples set forth herein and that such examples and embodiments are presented by way of example only with the scope of the disclosure intended to be limited only by the claims set forth herein as follows.

What is claimed is:

1. A method of treating a fibrous substrate, the method comprising applying a fluorine-free treating composition in an amount sufficient to make the fibrous substrate water repellent, wherein the treating composition comprises:
at least one polycarbodiimide compound derived from a carbodiimidization reaction of a carbodiimidization reaction mixture comprising at least one oligomer, wherein the oligomer comprises at least one isocyanate end group and at least two repeating units derived from at least one (meth)acrylate monomer, wherein the (meth)acrylate monomer has the following formula:

$$R^1—OC(O)C(R^2)=CH_2 \qquad \text{(Formula I)}$$

wherein:
$R^1$ comprises a hydrocarbon group having at least 16 carbon atoms; and
$R^2$ is H or $CH_3$.

2. The method of claim 1 wherein the at least one polycarbodiimide is further prepared from a reaction mixture that includes at least one isocyanate-reactive difunctional compound having the following formula:

$$H—X^3—(CH_2)_m(Z^1)_o—(CH_2)_nX^4—H \qquad \text{(Formula VIII)}$$

wherein:
X³ and X⁴ are independently S, —NH, —N(R¹⁰), or O, wherein R¹⁰ is a hydrocarbon group having 1 to 20 carbon atoms;
m and n are independently integers from 1 to 12;
o is 0 or 1; and
Z¹ is selected from:
a branched or straight chain alkylene group having 1 to 20 carbon atoms;
a divalent polydimethylsiloxane group comprising 2 to 100 dimethylsiloxane repeating units;
a divalent alkylene oxide group comprising 2 to 100 alkylene oxide repeating units; and
a combination thereof.

3. The method of claim 1 comprising applying the fluorine-free composition comprising at least one polycarbodiimide compound of the formula:

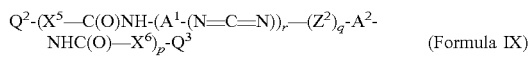  (Formula IX)

wherein:
X⁵ and X⁶ are independently S, —NH, —N(R¹¹), or O, wherein R¹¹ is a hydrocarbon group having 1 to 20 carbon atoms;
A¹ and A² are independently the residue of an organic diisocyanate compound obtained by removing the isocyanate groups therefrom;
q=0 or 1;
p is an integer from 1 to 10;
r is an integer from 1 to 20;
Z² is a divalent group of the formula:

—X³—(CH₂)ₘ—(Z¹)ₒ—(CH₂)ₙ—X⁴—  (Formula X)

wherein:
X³ and X⁴ are independently S, —NH, —N(R¹¹), or O, wherein R¹¹ is a hydrocarbon group having 1 to 20 carbon atoms;
m and n are independently integers from 1 to 12;
o is 0 or 1; and
Z¹ is selected from:
a branched or straight chain alkylene group having 1 to 20 carbon atoms;
a divalent polydimethylsiloxane group comprising 2 to 100 dimethylsiloxane repeating units;
a divalent alkylene oxide group comprising 2 to 100 alkylene oxide repeating units; and
a combination thereof;
Q² and Q³ are independently selected from:
a hydrocarbon group having at least 2 carbon atoms; and
a group having the formula:

—(CH₂)ₐ—S—U  (Formula XI)

wherein:
a is an integer from 1 to 10;
S is sulfur; and
U is selected from:
an oligomer comprising 2 to 20 repeating units derived from (meth)acrylate monomers, each repeating unit independently comprising an alkyl group having at least 16 carbon atoms;
an oligomer comprising 2 to 20 repeating units derived from urethane-containing (meth)acrylate monomers, each repeating unit independently comprising an alkyl group having at least 16 carbon atoms;
an oligomer comprising 2 to 20 repeating units derived from urea-containing (meth)acrylate monomers, each repeating unit independently comprising an alkyl group having at least 16 carbon atoms; and
a combination thereof;
with the proviso that Q² and Q³ cannot both be a hydrocarbon group having at least 2 carbon atoms.

4. The method of claim 1 wherein the treating composition comprises:
at least one polycarbodiimide compound derived from a carbodiimidization reaction of a carbodiimidization reaction mixture comprising 4,4'-methylenebis(phenyl isocyanate) and an acrylate oligomer in a molar ratio of 2:1 to 10:1, wherein the acrylate oligomer is made by reaction of an oligomerization reaction mixture comprising mercaptoethanol and octadecylacrylate in a molar ratio of 1:4 to 1:20.

5. The method of claim 1 wherein the treating composition comprises:
at least one polycarbodiimide compound derived from a carbodiimidization reaction of a carbodiimidization reaction mixture comprising 4,4'-methylenebis(phenyl isocyanate) and an acrylate oligomer in a molar ratio of 2:1 to 10:1, wherein the acrylate oligomer is made by reaction of an oligomerization reaction mixture comprising mercaptoethanol and a reaction product of octadecyl isocyanate with 2-hydroxyethyl (meth)acrylate, wherein the mercaptoethanol and the reaction product are reacted in a molar ratio of 1:4 to 1:20.

6. The method of claim 1 wherein the treating composition comprises:
at least one polycarbodiimide compound derived from a carbodiimidization reaction of a carbodiimidization reaction mixture comprising 4,4'-methylenebis(phenyl isocyanate) and an acrylate oligomer in a molar ratio of 2:1 to 10:1, wherein the acrylate oligomer is made by reaction of an oligomerization reaction mixture comprising mercaptoethanol and a reaction product of octadecanol with 2-isocyanato ethyl (meth)acrylate, wherein the mercaptoethanol and the reaction product are reacted in a molar ratio of 1:4 to 1:20.

7. The method of claim 1 wherein the treating composition further comprises at least one paraffin wax.

8. The method of claim 1 wherein the fibrous substrate is selected from the group consisting of textile, leather, carpet, paper, and nonwoven fabrics.

9. The method of claim 1 wherein the treating composition is an aqueous dispersion optionally further comprising one or more of a surfactant, a coalescing solvent, an antifreeze solvent, an emulsifier, or a stabilizer against one or more microorganisms.

10. A fibrous substrate treated by the method of claim 1.

* * * * *